US011946268B2

(12) United States Patent
Logan

(10) Patent No.: US 11,946,268 B2
(45) **Date of Patent: *Apr. 2, 2024**

(54) SYSTEM FOR TREATING A SURFACE

(71) Applicant: FORJAK Industrial, Inc., Columbus, OH (US)

(72) Inventor: Adam Garvey Logan, Pickerington, OH (US)

(73) Assignee: FORJAK Industrial, Inc., Columbus, OH (US)

( * ) Notice: Subject to any disclaimer, the term of this patent is extended or adjusted under 35 U.S.C. 154(b) by 789 days.

This patent is subject to a terminal disclaimer.

(21) Appl. No.: 17/017,931

(22) Filed: Sep. 11, 2020

(65) Prior Publication Data

US 2020/0407989 A1 Dec. 31, 2020

Related U.S. Application Data

(63) Continuation of application No. 15/793,056, filed on Oct. 25, 2017, now Pat. No. 10,774,549.

(60) Provisional application No. 62/412,492, filed on Oct. 25, 2016.

(51) Int. Cl.

| | |
|---|---|
| ***E04G 23/00*** | (2006.01) |
| ***B05B 13/00*** | (2006.01) |
| ***B05B 13/04*** | (2006.01) |
| ***B08B 3/02*** | (2006.01) |
| ***B66F 9/065*** | (2006.01) |
| *B66C 17/04* | (2006.01) |
| *B66F 11/04* | (2006.01) |

(52) U.S. Cl.

CPC .......... *E04G 23/002* (2013.01); *B05B 13/005* (2013.01); *B05B 13/041* (2013.01); *B08B 3/024* (2013.01); *B66F 9/0655* (2013.01); *B66C 17/04* (2013.01); *B66F 11/044* (2013.01)

(58) Field of Classification Search

CPC .................................................... E04G 23/002

See application file for complete search history.

(56) References Cited

U.S. PATENT DOCUMENTS

| | | | |
|---|---|---|---|
| 2,365,755 | A | 12/1944 | Griffith |
| 2,574,206 | A | 11/1951 | Browning |
| 3,274,860 | A | 9/1966 | Gauthier et al. |
| 3,592,387 | A | 7/1971 | Pilott et al. |
| 4,762,013 | A | 8/1988 | Peter et al. |
| 5,346,140 | A | 9/1994 | Campbell |
| 5,935,657 | A | 8/1999 | Melendez |
| 8,726,833 | B2 | 5/2014 | Logan et al. |
| 10,179,344 | B2 | 1/2019 | Logan et al. |
| 10,406,549 | B2 | 9/2019 | Logan |
| 10,774,549 | B2 | 9/2020 | Logan |
| 2006/0005765 | A1 | 1/2006 | Davidson |
| 2013/0236644 | A1 | 9/2013 | Logan et al. |
| 2014/0061429 | A1 | 3/2014 | Chen |
| 2014/0220250 | A1 | 8/2014 | Logan et al. |

(Continued)

FOREIGN PATENT DOCUMENTS

| | | |
|---|---|---|
| JP | 62-216667 A | 9/1987 |

OTHER PUBLICATIONS

Ganey, Steven J.; Non-Final Office Action issued in U.S. Appl. No. 16/538,171; dated Jun. 8, 2021; 15 pages.

*Primary Examiner* — Jason Y Ko

(74) *Attorney, Agent, or Firm* — Frost Brown Todd LLP

(57) ABSTRACT

An apparatus for treating a surface of a structure includes a main carriage having an accessory carriage that is vertically movable with respect to the main carriage.

20 Claims, 23 Drawing Sheets

(56) References Cited

U.S. PATENT DOCUMENTS

| | | | |
|---|---|---|---|
| 2018/0093289 | A1 | 4/2018 | Raman et al. |
| 2020/0122178 | A1 | 4/2020 | Logan |

SYSTEM FOR TREATING A SURFACE

REFERENCE TO RELATED APPLICATION

This application is a continuation of U.S. patent application Ser. No. 15/793,056, entitled Apparatus for Treating a Surface and Vehicle for Same, filed Oct. 25, 2017, which claims priority to U.S. provisional patent application Ser. No. 62/412,492, entitled System for Treating a Surface, filed Oct. 25, 2016, and hereby incorporates these patent applications by reference herein in their respective entireties.

TECHNICAL FIELD

This application relates generally to treating a surface, and more particularly to a system for treating a surface of a structure along a substantially vertical path.

BACKGROUND

Certain structures, such as interior walls, exterior walls, and/or ceilings of buildings, require periodic maintenance that includes painting. Known methods of painting such structures include manually preparing the structure for the application of paint using brushes and/or water spray nozzles, and then manually painting the structure, which is labor intensive.

SUMMARY

In accordance with one embodiment, an apparatus for treating a surface of a structure is provided. The apparatus comprises a carriage assembly and a surface treatment device. The carriage assembly comprises a main carriage and an accessory carriage. The main carriage comprises a lowermost portion. The accessory carriage is movable with respect to the main carriage between a retracted position and a lowered position. The surface treatment device is coupled with the accessory carriage. When the accessory carriage is in the lowered position, the accessory carriage is vertically spaced apart from the lowermost portion of the main carriage.

In accordance with another embodiment, a system for treating a surface of a structure is provided. The system comprises: a vehicle, a carriage assembly, a surface treatment device, a reservoir, and a supply unit. The vehicle is movable along a surface and comprises a frame and a mast movably coupled with the frame. The carriage assembly is supported by the mast. The carriage assembly comprises a main carriage and an accessory carriage that is movable with respect to the main carriage between a retracted position and a lowered position. The surface treatment device is coupled with the accessory carriage. The reservoir is supported by one of the vehicle and the carriage assembly. The supply unit is in communication with the surface treatment device and configured to supply material from the reservoir to the surface treatment device. The mast is operable for raising and lowering the carriage assembly. The accessory carriage is vertically spaced apart from the main carriage when in the lowered position.

In accordance with yet another embodiment, a system for treating a surface of a structure is provided. The system comprises: a vehicle, a carriage assembly, a surface treatment device, a reservoir, a supply unit, and a winch. The vehicle is movable along a surface and comprises a frame and a mast movably coupled with the frame. The carriage assembly is supported by the mast. The carriage assembly comprises a main carriage and an accessory carriage that is movable with respect to the main carriage between a retracted position and a lowered position. The surface treatment device is coupled with the accessory carriage. The reservoir is supported by one of the vehicle and the carriage assembly. The supply unit is in communication with the surface treatment device and configured to supply material from the reservoir to the surface treatment device. The winch is mounted on the main carriage and comprises a cable that is coupled with the accessory carriage. The mast is operable for raising and lowering the carriage assembly. The accessory carriage is vertically spaced apart from the main carriage when in the lowered position. The main carriage comprises a lowermost portion. When the accessory carriage is in the lowered position, the accessory carriage is vertically spaced apart from the lowermost portion of the main carriage. The winch facilitates raising and lowering of the accessory carriage between the raised position and the lowered position.

BRIEF DESCRIPTION OF THE DRAWINGS

Various embodiments of a system and method for treating a surface of a structure will become better understood with regard to the following description, appended claims and accompanying drawings wherein:

DETAILED DESCRIPTION

Figure 1:
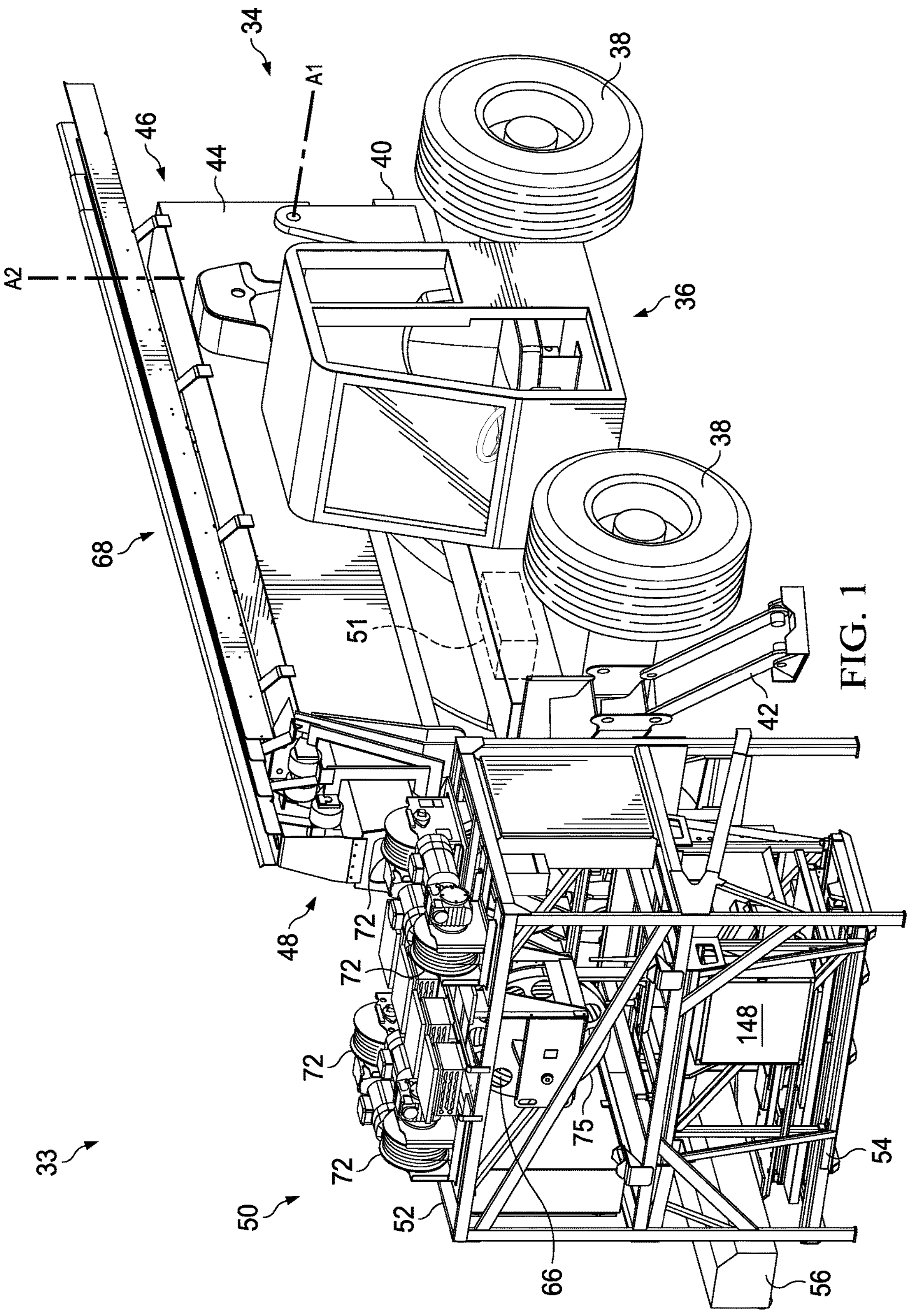
FIG. 1 is an isometric view depicting a system for treating a surface of a structure according to one embodiment, the system having a having a carriage assembly with a main carriage and an accessory carriage.

Referring to the drawings, wherein like reference numbers indicate the same or corresponding elements throughout the views, FIGS. 1-35 illustrate a system 33, according to one embodiment, for coating (e.g., painting) a structure. As illustrated in FIG. 1, the system 33 can include a vehicle 34 having a passenger compartment 36 and a plurality of wheels 38 rotatably coupled with a frame 40. The wheels 38 can be operably coupled with a power source, such as an electric or fuel based engine, for example, that selectively facilitates propulsion of the vehicle 34 along a ground surface. The vehicle 34 can also include outriggers (e.g., 42) that can selectively engage the ground surface to enhance lateral stability of the vehicle 34.

A mast 44 can have a proximal end 46 that is coupled with the frame 40 and a distal end 48 that is coupled with a carriage assembly 50. The proximal end 46 of the mast 44 can be pivotally attached to the frame 40 to facilitate pivoting of the mast 44 about a substantially horizontal axis A1 which can facilitate pivoting of the carriage assembly 50 between a raised position (see FIGS. 2 and 3) and a lowered position (FIG. 1). In some embodiments, the proximal end 46 of the mast 44 can also be rotatably coupled with the frame 40 to facilitate pivoting of the mast 44 about a substantially vertical axis A2, which can facilitate rightward and leftward movement of the carriage assembly 50. The mast 44 can also be configured to selectively telescope to facilitate movement of the carriage assembly 50 between an extended position (see FIGS. 2 and 3) and a retracted position relative to the proximal end 46 of the mast 44. In one embodiment, the carriage assembly 50 can also be movably coupled to the distal end 48 of the mast 44 to allow for vertical and/or horizontal pivoting of the carriage assembly 50. The vehicle 34 can include an electronic controller 51 that allows a user to control positioning of the vehicle 34, the mast 44 and/or the carriage assembly 50. The electronic controller 51 can include a user interface (not shown) located in the passenger compartment 36 and/or along an exterior of the vehicle 34, that a user can interact with to control operation of the vehicle 34, the mast 44 and/or the carriage assembly 50. The user interface can include mechanical levers, an electronic control panel or any of a variety of suitable alternative devices. It is to be appreciated that the mast 44 and/or the carriage assembly 50 can be powered pneumatically, electrically, and/or or with any of a variety of suitable alternative methods. It is also to be appreciated that any of a variety of suitable alternative vehicles can be used such as, for example, a crane or a drywall boom truck.

Figure 2:
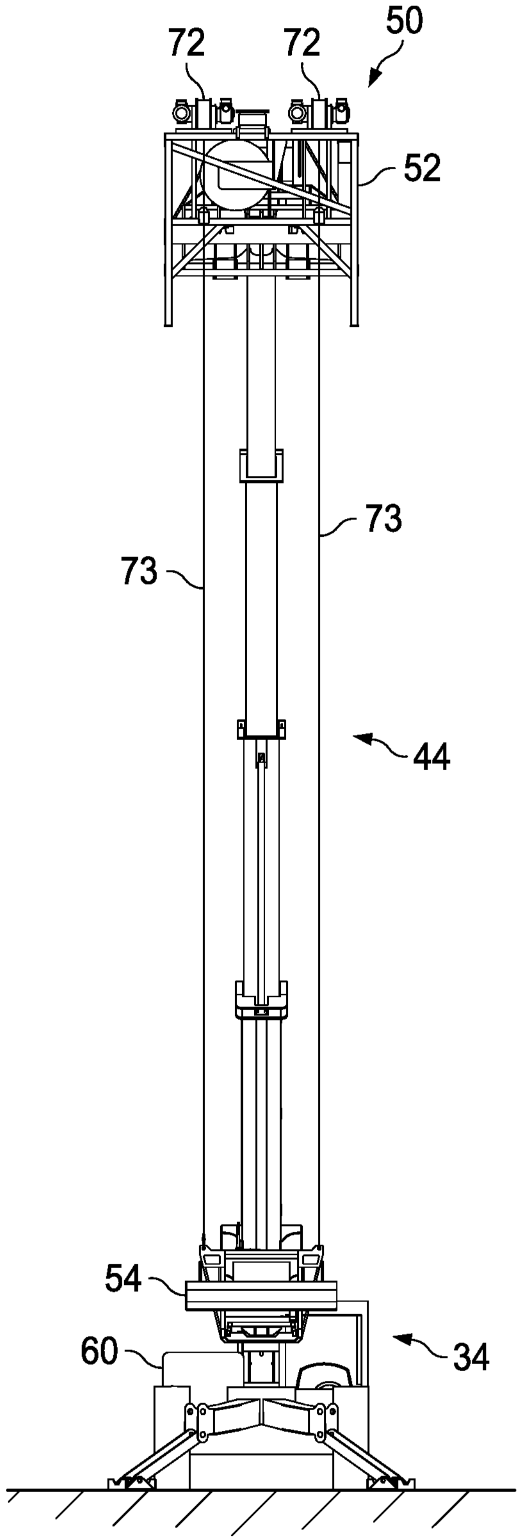
FIG. 2 is a front view depicting the system of FIG. 1, wherein the main carriage is shown in a raised position with the accessory carriage in a lowered position.
Figure 3:
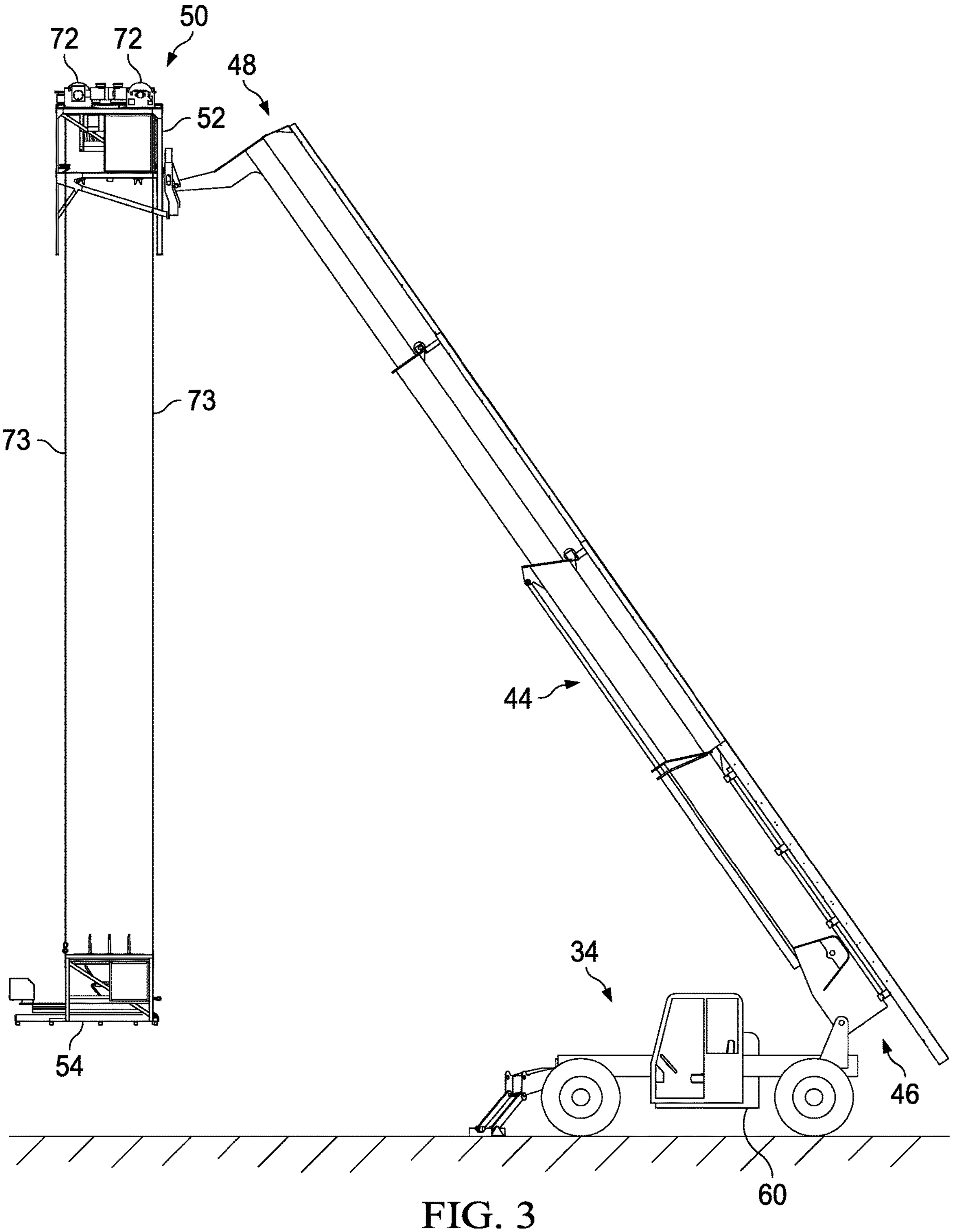
FIG. 3 is a side view depicting the wheeled cart of FIG. 2.
Figure 4:
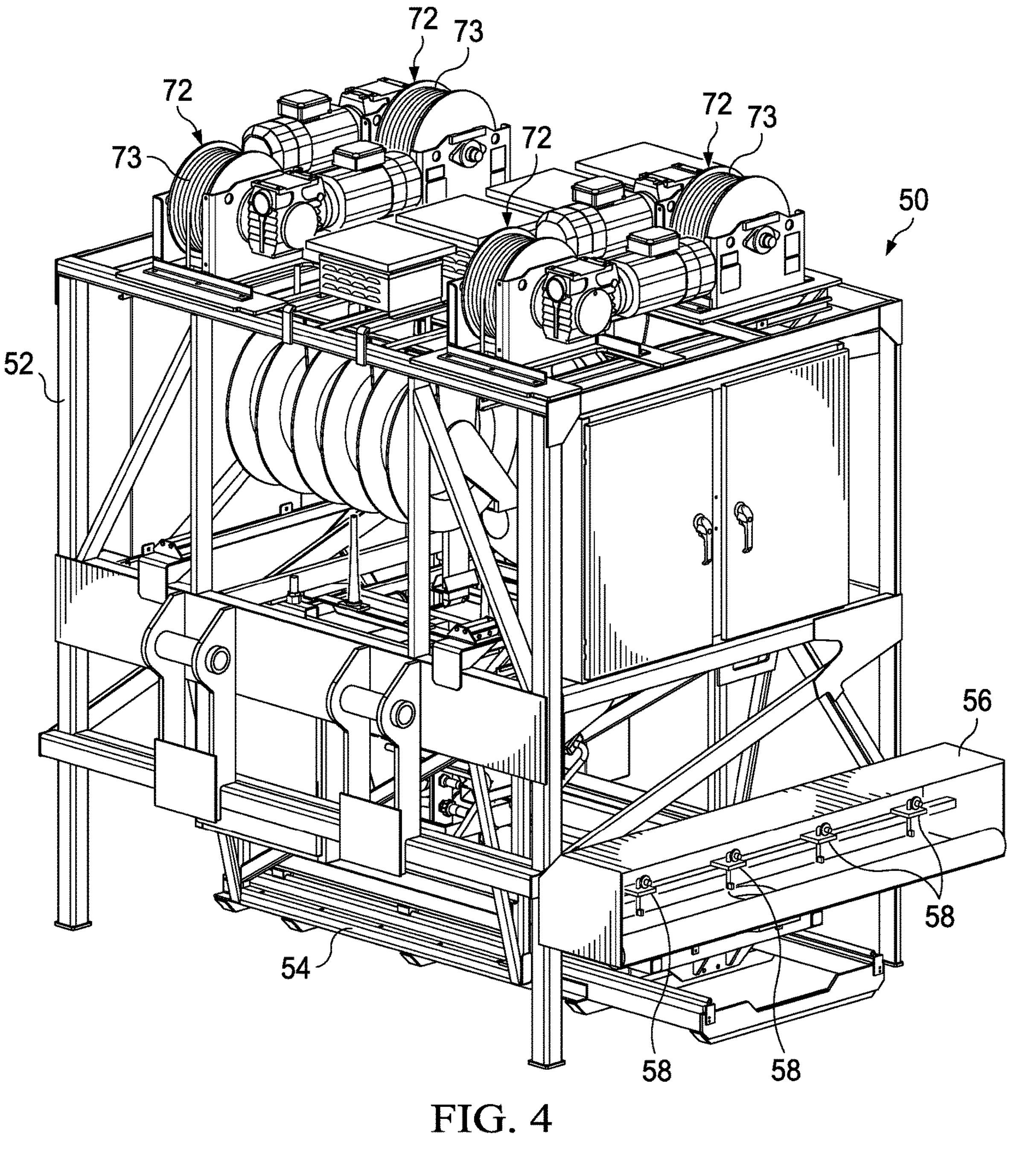
FIG. 4 is an isometric view depicting the carriage assembly of FIG. 1.

The carriage assembly 50 can include a main carriage 52 and an accessory carriage 54 that is movably coupled with the main carriage 52. The accessory carriage 54 can include an accessory head 56 that accommodates a plurality of spray heads (e.g., 58 in FIG. 4) that facilitates the spraying of paint, or other fluid, from the carriage assembly 50. As illustrated in FIGS. 2 and 3, the system 33 can include a supply unit 60 that includes a pump and a reservoir. A feed line 66 (FIGS. 1 and 5) can be in fluid communication with the spray heads 58 and the pump. When the pump operates, paint can be pumped from the reservoir and distributed to the spray heads 58 via the feed line 66. It is to be appreciated that paint can be delivered from the reservoir via any of a variety of suitable additional or alternative methods.

The feed line 66 can be routed from the carriage assembly 50 along a trough 68 on the mast 44. The trough 68 can be configured to telescope together with the mast 44. The feed line 66 can be provided in a flexible raceway that guides the feed line 66 along the trough 68 when the mast 44 is telescoped.

The accessory head 56 can be configured to accommodate, or can be configured to be interchangeable with, a variety of suitable alternative surface treatment devices or combinations thereof, such as, for example, a media blasting (e.g., sandblasting) assembly, a power washing head, a caulk removal/replacement system, a wire brush for coating removal, an agitating scrub brush for preparing a surface, a shield adaptor for applying of a coating (e.g., paint) in a clean line against another coating or substrate, or surface grinder heads having shrouds and that facilitate scraping/grinding of a coating from a surface. The supply unit 60 can be configured to facilitate a supply of appropriate material(s) to these surface treatment devices. For example, the supply unit 60 can be configured to provide water for power washing or scrubbing or to provide media (e.g., sand) for media blasting. The accessory head 56 can additionally support material reclamation systems for the surface treatment devices that might warrant material reclamation such as, for example, the media blasting assembly, the caulk removal/replacement system, the wire brush, the scrub brush, or the surface grinder heads.

The accessory carriage 54 can be movable in a substantially vertical direction with respect to the main carriage 52 between a retracted position (FIG. 1) and a lowered position (FIGS. 2 and 3). The main carriage 52 can comprise a plurality of legs 53 that define a lowermost portion of the main carriage 52. The lowermost portion can be understood to be the portion of the main carriage 52 that is nearest to a ground surface. When the accessory carriage 54 is in the retracted position, the main carriage 52 and the accessory carriage 54 can be nested together such that the legs 53 extend alongside the accessory carriage 54. When the accessory carriage 54 is in the lowered position, the accessory carriage 54 can be vertically spaced from the legs 53 of the main carriage 52 such that the accessory carriage 54 is disposed vertically beneath the main carriage 52. When the carriage assembly 50 is provided on a ground surface with the accessory carriage 54 in the retracted position, the carriage assembly 50 can be supported by the legs 53 of the main carriage 52.

In one embodiment, as illustrated in FIGS. 1-5, a plurality of winches 72 can be mounted on the main carriage 52 and can each have a cable 73 (FIGS. 3-5) that is coupled with the accessory carriage 54. The cable 73 can be wound and unwound by the winches 72 (e.g., manually or with a motor) substantially simultaneously to facilitate raising and lowering of the accessory carriage 54 between the raised position and the lowered position. It is to be appreciated that the accessory carriage 54 can be alternatively raised and lowered by a system that can include one or more hydraulic cylinders and one or more chains, in a manner known in the art. In other embodiments, accessory carriages can be provided that can be raised and lowered in a manner other than that shown.

The winches 72 can be in electrical communication with the electronic controller 51 to facilitate control of the positioning of the accessory carriage 54 with respect to the main carriage 52. A user interface (not shown) can be associated with the electronic controller 51 to allow for user control of the positioning of the accessory carriage 54 and can include mechanical levers, an electronic control panel or any of a variety of suitable alternative devices that enable user control. The user interface can be a standalone interface or can be combined with other user interfaces on the vehicle 34 (e.g., the user interface for controlling the mast 44).

Figure 5:
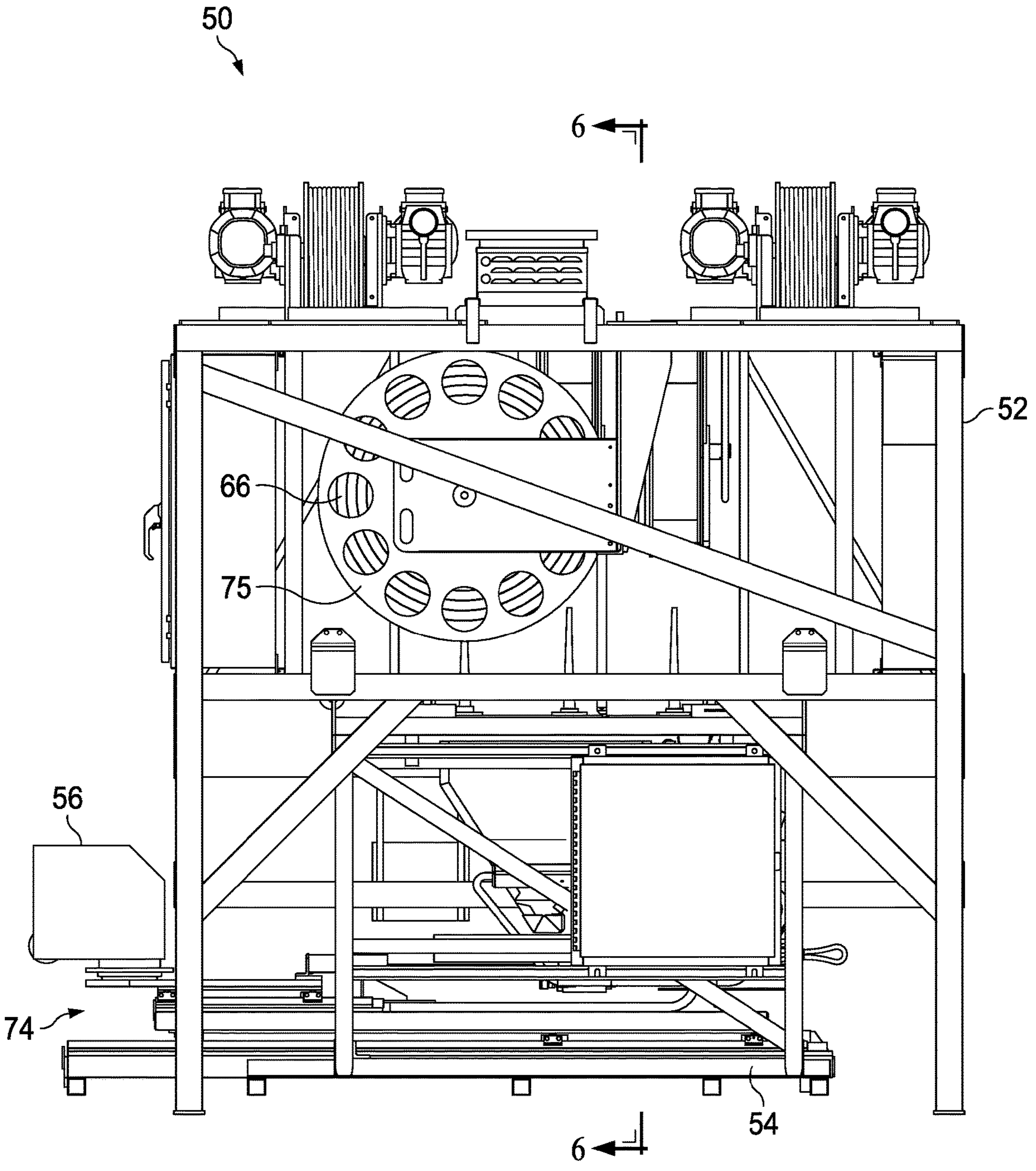
FIG. 5 is a front view depicting the carriage assembly of FIG. 4.
Figure 6:
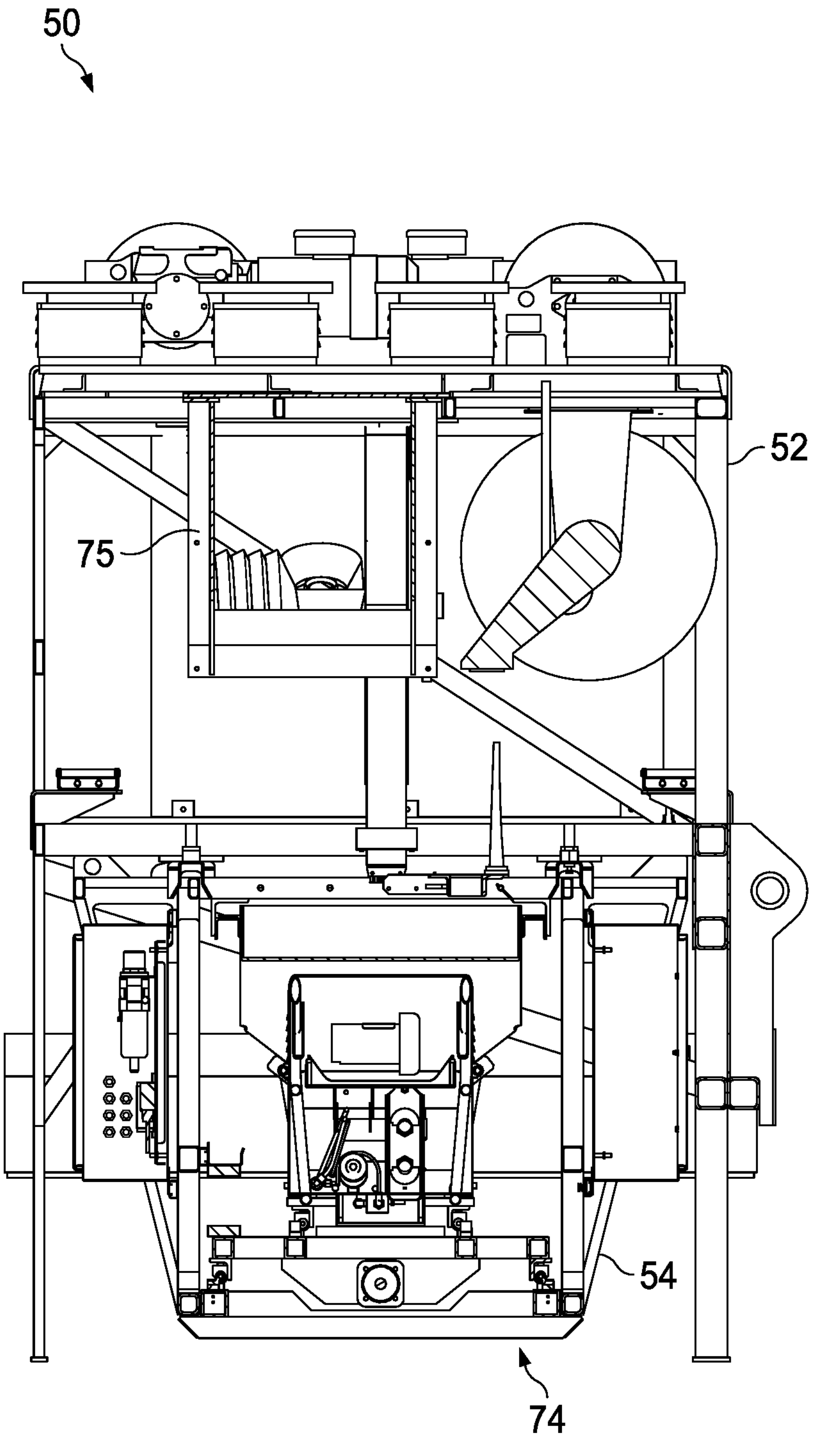
FIG. 6 is a sectional view taken along the line 6-6 in FIG. 5.

As illustrated in FIGS. 1 and 5, the feed line 66 can be wound on a spool 75 that is rotatably coupled with the accessory carriage 54. When the accessory carriage 54 is moved between the retracted position and the lowered position, the spool 75 can selectively collect and dispense the feed line 66, respectively such that the feed line 66 is able to remain in communication with the spray heads 58. In one embodiment, the spool 75 can be configured to automatically collect and dispense the feed line 66 when the accessory carriage 54 is moved. In some embodiments, the spool 75 can be spring driven and can have a slip ring that facilitates collection/dispensation of the feed line 66 onto/from the spool 75.

Figure 7:
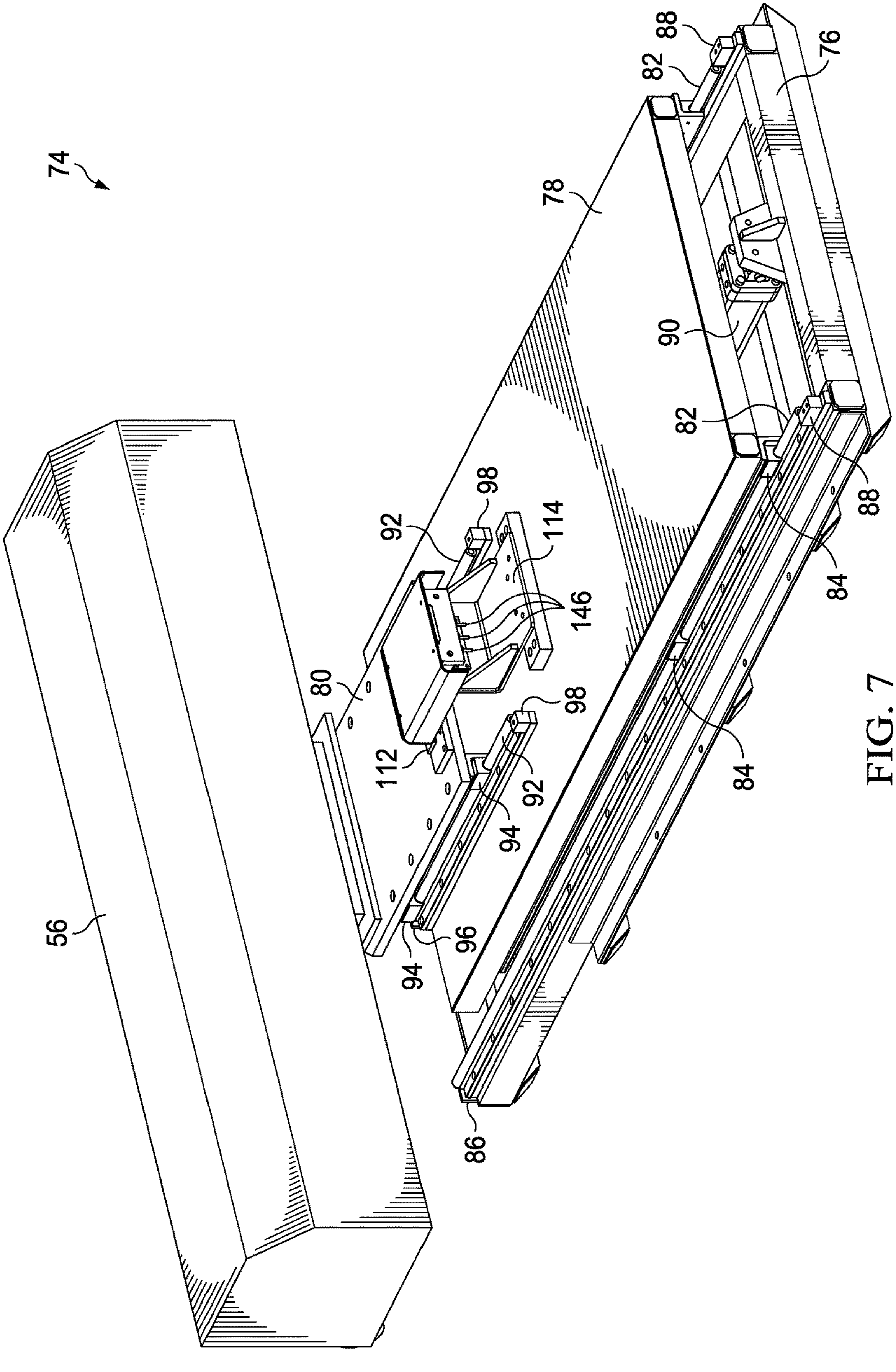
FIG. 7 is an isometric view depicting a support table of the accessory carriage of the carriage assembly of FIG. 1, the support table shown in association with an accessory head.
Figure 8:
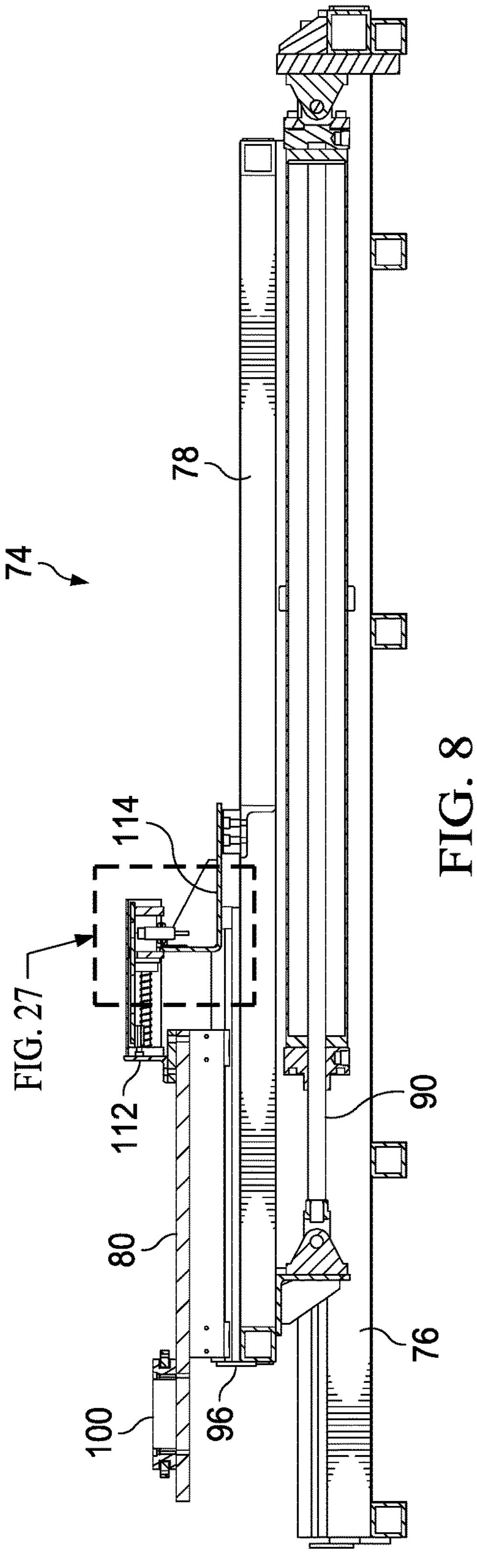
FIG. 8 is a sectional view taken along the line 8-8 in FIG. 10, wherein the accessory head removed for clarity of illustration.
Figure 9:
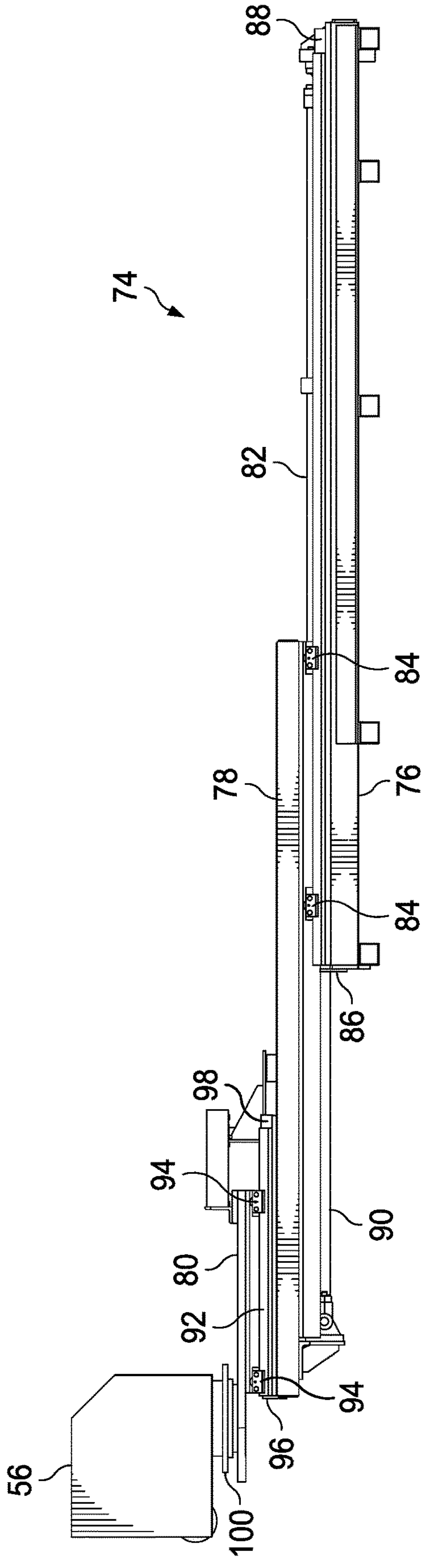
FIG. 9 is a side view depicting the support table of FIG. 7.
Figure 12:
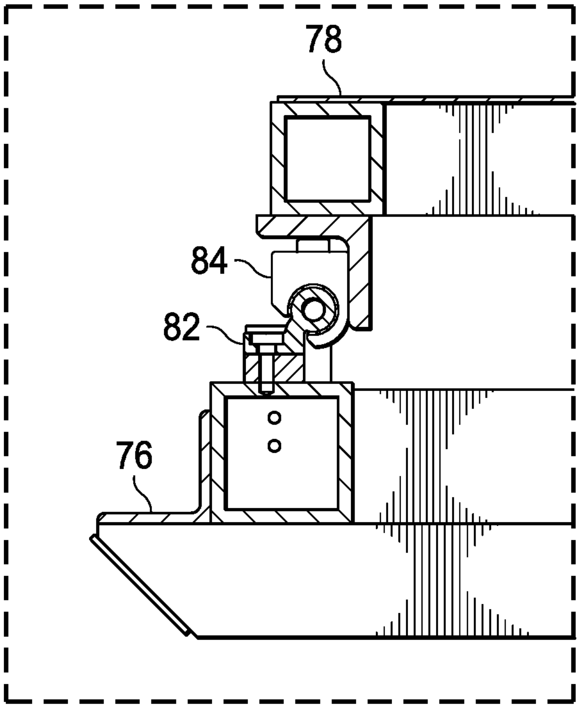
FIG. 12 is an enlarged view depicting the encircled portion of FIG. 14.
Figure 13:
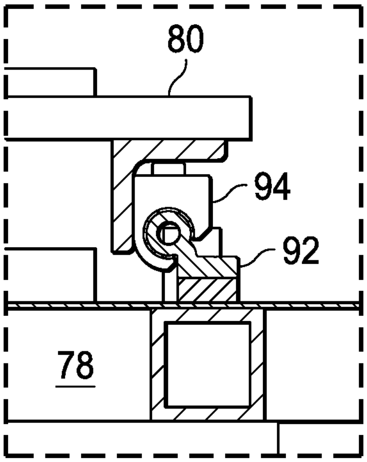
FIG. 13 is an enlarged view depicting the encircled portion of FIG. 14.
Figure 14:
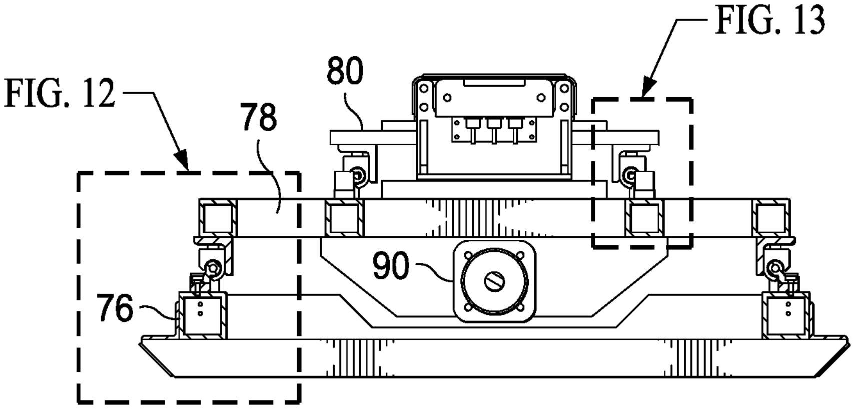
FIG. 14 is a rear view depicting the support table of FIG. 7.

Referring now to FIGS. 5-14, a support table 74 can be coupled with the accessory carriage 54 and can facilitate sliding of the accessory head 56 relative to the accessory carriage 54. The support table 74 can include a base plate 76, an intermediate plate 78, and an upper plate 80. The base plate 76 can be rigidly coupled with the accessory carriage 54, such as with bolts or through welding, for example. The intermediate plate 78 can be slidably coupled with the base plate 76 such that the intermediate plate 78 is slidable relative to the base plate 76. In one embodiment, as illustrated in FIGS. 7, 9, and 12, the base plate 76 can include a pair of guide rails 82 and the intermediate plate 78 can include a plurality of bearing blocks (e.g., 84) that interact with the guide rails 82 to allow for sliding of the intermediate plate 78 thereon. Respective front table stops 86 and rear table stops (e.g., 88) can be provided at opposite ends of each guide rail 82 and can selectively contact the bearing blocks (e.g., 84) to prevent the intermediate plate 78 from sliding off of the guide rails 82. A tie rod 90 (FIGS. 7 and 10) can be operably coupled with each of the base plate 76 and the intermediate plate 78 and can be configured to facilitate movement of the intermediate plate 78 between a retracted position (FIGS. 7, 8, 10 and 11) and an extended position (FIG. 9). The tie rod 90 can be electrically and/or pneumatically powered or powered with any of a variety of suitable alternative methods. In one embodiment, the tie rod 90 can be a double acting single rod tie rod.

The upper plate 80 can be slidably coupled with the intermediate plate 78 such that the upper plate 80 is slidable relative to the intermediate plate 78. In one embodiment, as illustrated in FIGS. 7, 9, and 12, the intermediate plate 78 can include a pair of guide rails 92 and the upper plate 80 can include a plurality of bearing blocks (e.g., 94) that interact with the guide rails 92 to allow for sliding of the intermediate plate 78 thereon. Respective front table stops 96 and rear table stops (e.g., 98) can be provided at opposite ends of each guide rail 92 and can selectively contact the bearing blocks (e.g., 94) to prevent the upper plate 80 from sliding off of the guide rails 92. A mounting plate 100 (FIG. 8) can be coupled with the upper plate 80. As illustrated in FIGS. 7 and 9, the accessory head 56 can be coupled with the mounting plate 100, such as, for example, with screws, bolts, or welded thereto. It is to be appreciated that, in some embodiments, a surface treatment device can be mounted directly to the mounting plate 100 or the upper plate 80 in lieu of the accessory head 56.

The tie rod 90 can be in electrical communication with the electronic controller 51 to facilitate control of the positioning of the upper plate 80 and, thus, the accessory head 56 relative to the accessory carriage 54. A user interface (not shown) can be associated with the electronic controller 51 to allow for user control of the positioning of the accessory head 56 and can include mechanical levers, an electronic control panel or any of a variety of suitable alternative devices that enable user control. The user interface can be a standalone interface or can be combined with other user interfaces on the vehicle 34 (e.g., the user interface for controlling the mast 44 and/or the winches 72).

Figure 10:
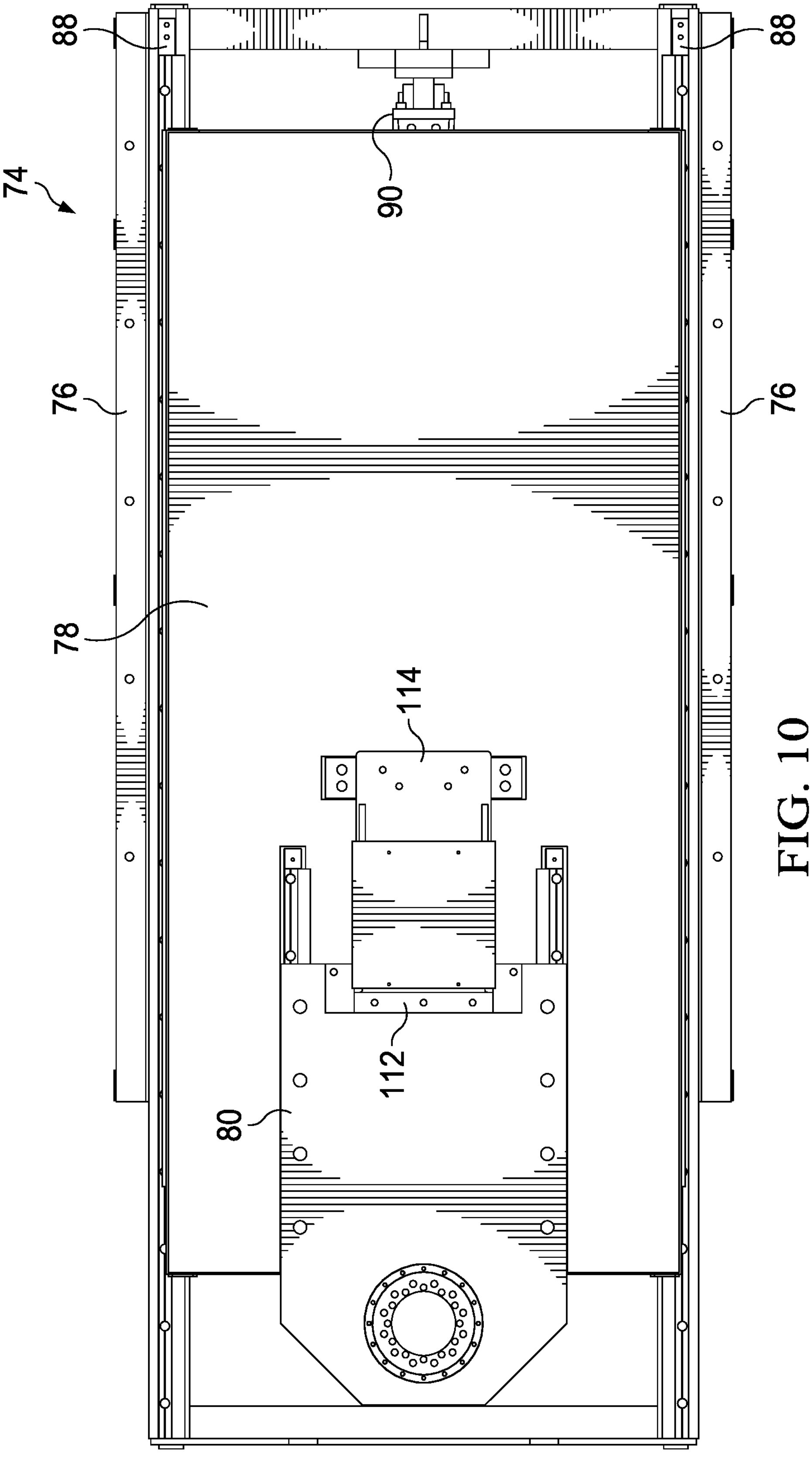
FIG. 10 is a top view depicting the support table of FIG. 7.
Figure 11:
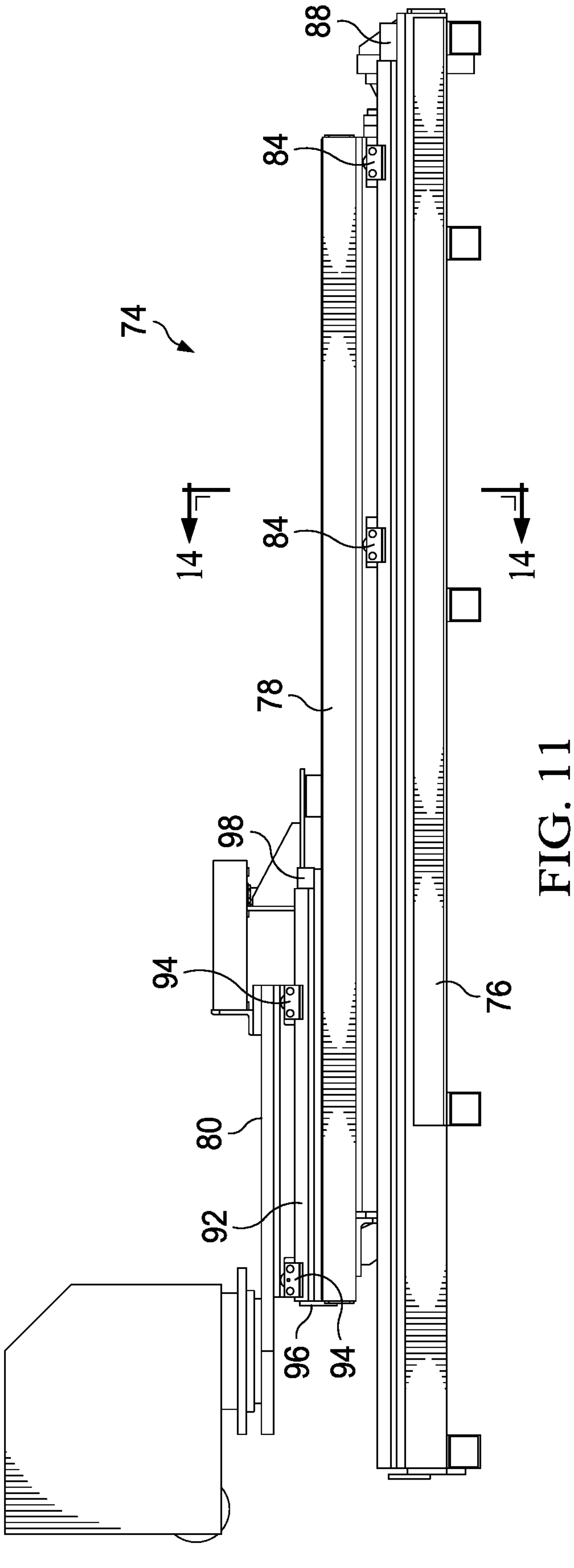
FIG. 11 is a side view depicting the support table of FIG. 7.

Referring now to FIGS. 15-18, the support table 74 can include a spring assembly 102 that include a front mount plate 104, a rear mount plate 106, a spring stop plate 108, and a pair of pins 110. The spring assembly 102 can be operably coupled with the intermediate plate 78 and the upper plate 80. For example, as illustrated in FIGS. 7, 8 and 10, the front mount plate 104 and the rear mount plate 106 can be coupled with the upper plate 80 and the intermediate plate 78 by respective brackets 112, 114.

Figure 19:
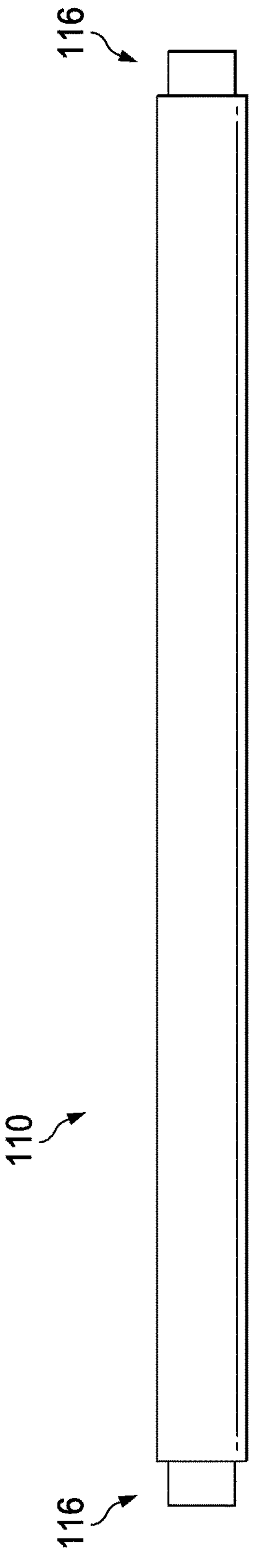
FIG. 19 is a side view depicting a pin of the spring assembly of FIG. 15.
Figure 20:
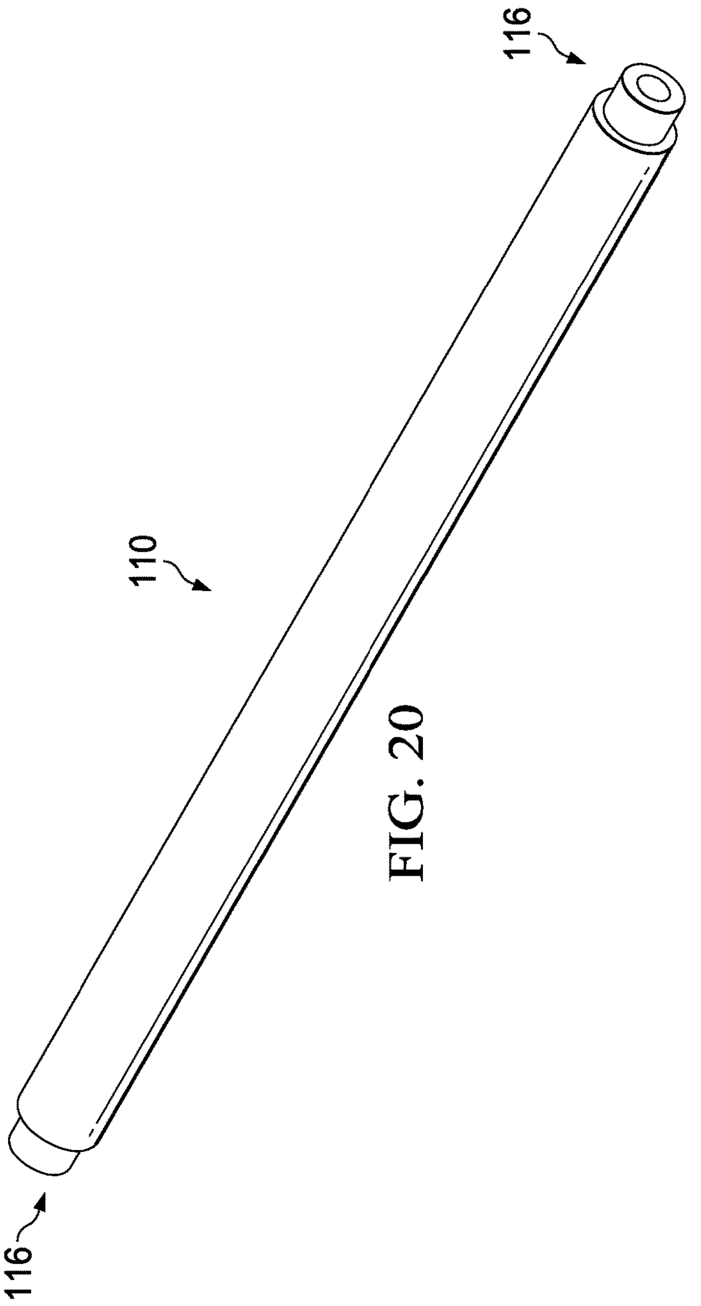
FIG. 20 is an isometric view depicting the pin of FIG. 19.
Figure 21:
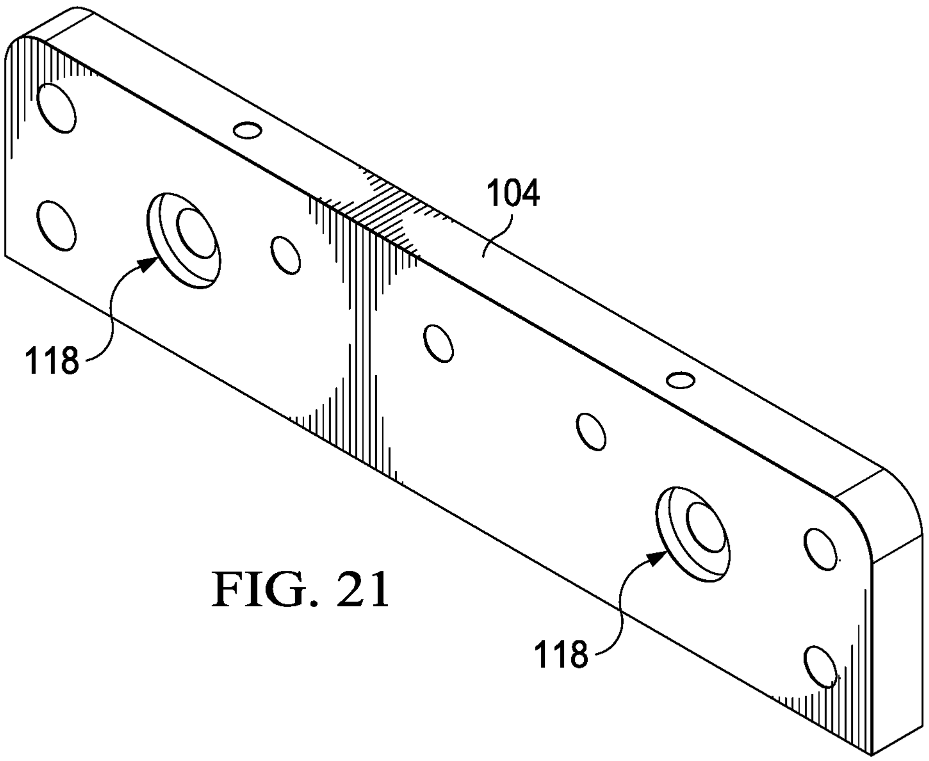
FIG. 21 is an isometric view depicting a front mount plate of the spring assembly of FIG. 15.
Figure 22:
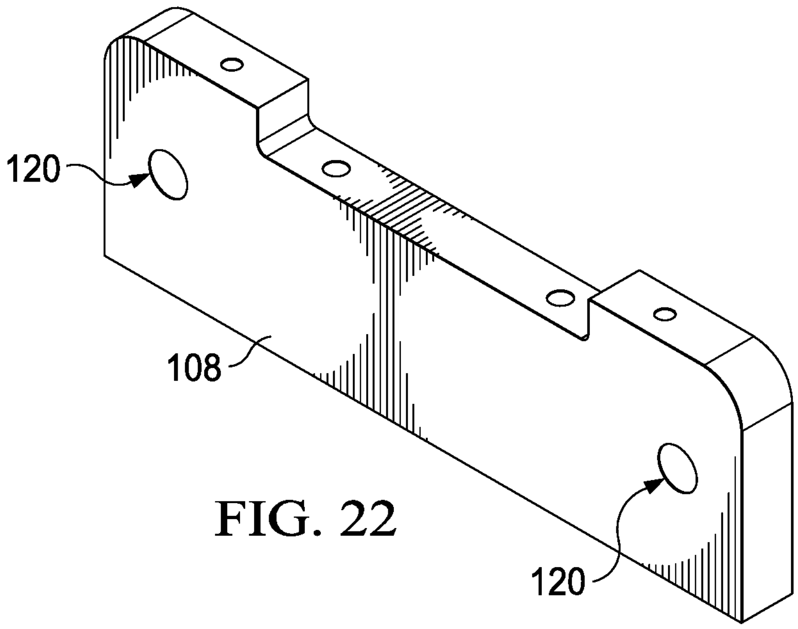
FIG. 22 is an isometric view depicting a spring stop plate of the spring assembly of FIG. 15.

The pins 110 can facilitate slidable coupling between the front mount plate 104 and the rear mount plate 106. As illustrated in FIGS. 19 and 20, each pin 110 can have tapered ends 116. As illustrated in FIG. 21, the front mount plate 104 can define a pair of holes 118 that are each configured to receive respective ones of the tapered ends 116 of the pins 110. As illustrated in FIG. 22, the spring stop plate 108 can define a pair of holes 120 that are also each configured to receive respective ones of the tapered ends 116 of the pins 110. One of the tapered ends 116 of each pin 110 can be inserted into one of the holes 118 of the front mount plate 104, and the other of the tapered ends 116 of each pin 110 can be inserted into one of the holes 120 of the spring stop plate 108 such that the pins 110 can extend between the front mount plate 104 and the spring stop plate 108.

Figure 15:
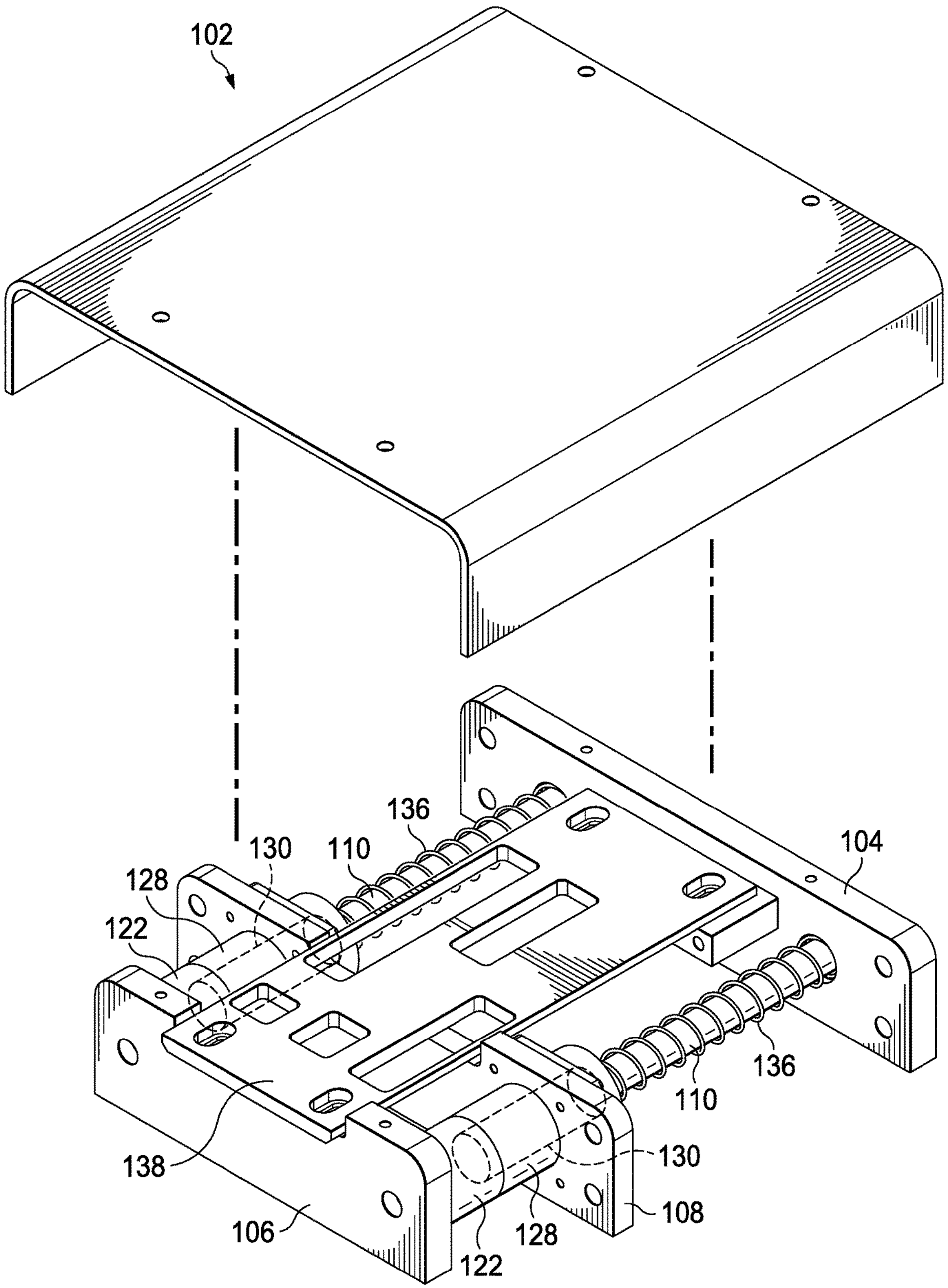
FIG. 15 is an exploded isometric view depicting a spring assembly of the support table of FIG. 7.
Figure 16:
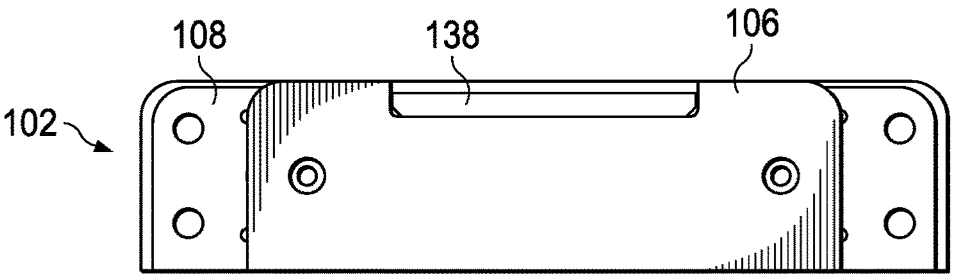
FIG. 16 is a rear view depicting the spring assembly of FIG. 7.
Figure 17:
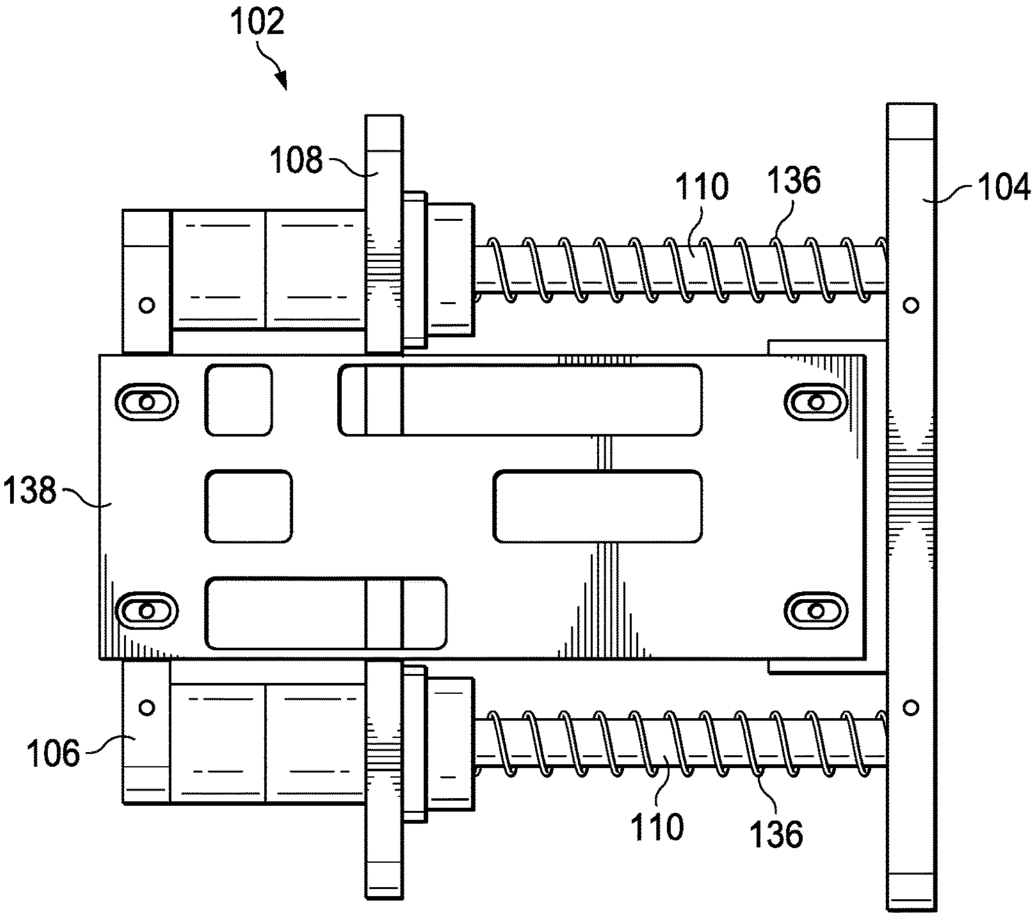
FIG. 17 is a top view depicting the spring assembly of FIG. 7.
Figure 18:
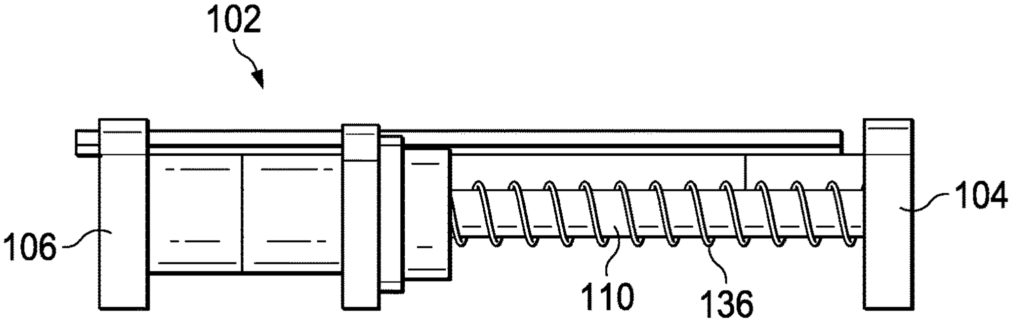
FIG. 18 is a side view depicting the spring assembly of FIG. 7.
Figure 23:
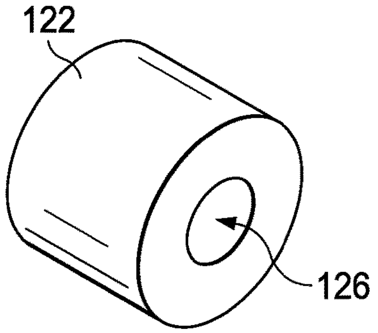
FIG. 23 is an isometric view depicting a back spacer of the spring assembly of FIG. 15.
Figure 24:
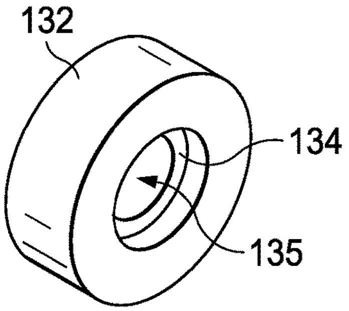
FIG. 24 is an isometric view depicting a spring locator plate of the spring assembly of FIG. 15.
Figure 25:
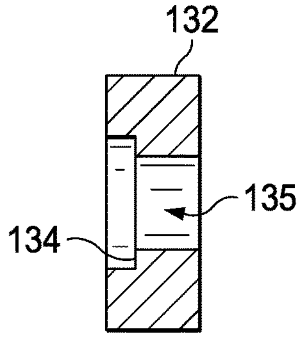
FIG. 25 is a sectional view depicting the spring locator plate of FIG. 25.

As illustrated in FIGS. 15-18, a pair of back spacers 122 (FIG. 15) can each extend from the spring stop plate 108 and can surround the pins 110. As illustrated in FIG. 23, each of the back spacers 122 can define a passage 126 through which the pins 110 can extend. Referring now to FIG. 15, the spring stop plate 108 can include a pair of collars 128 that each defines a channel 130. A spring locator plate 132, illustrated in FIGS. 24 and 25, can be disposed in each of the channels 130 and can include a radial shoulder 134 that defines a passageway 135. Each of the pins 110 can extend through one of the collars 128 and through the passageways 135 of the associated spring locator plate 132 to facilitate slidable coupling of the spring stop plate 108 with the front and rear mount plates 104, 106.

A spring 136 (FIG. 15) can be disposed on each of the pins 110 and can extend between the front mount plate 104 and the spring locator plate 132. The springs 136 can rest on the radial shoulder 134 of the spring locator plate 132. The springs 136 can cooperate to bias the spring stop plate 108 towards the rear mount plate 106. Certain of the surface treatment devices can be configured to contact the surface that is being treated. These surface treatment devices can include a roller, a wire brush, an agitating scrub brush, or surface grinder heads, for example. When these surface treatment devices make contact with the surface being treated, the spring assembly 102 can urge the surface treatment device towards the surface with enough force to maintain appropriate contact for treating the surface.

Figure 26:
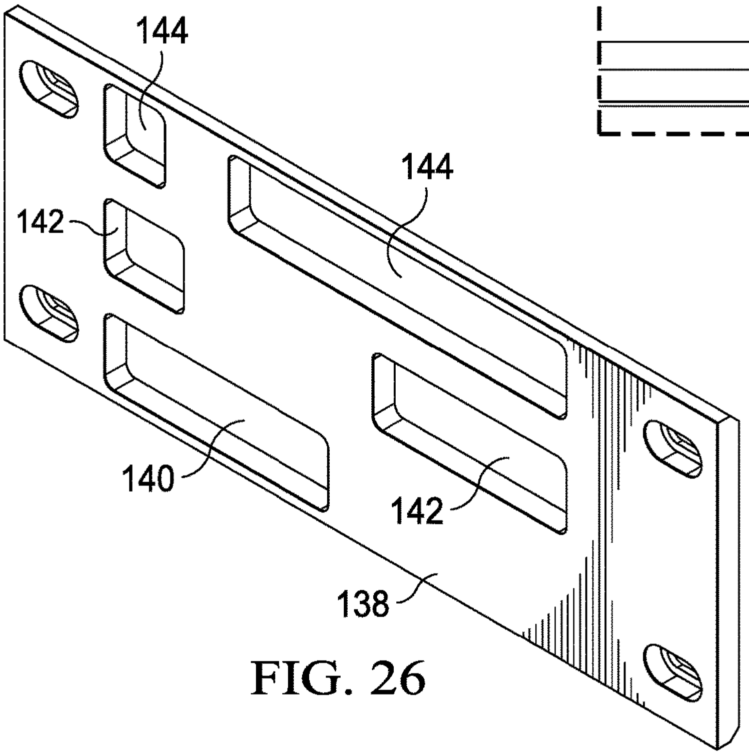
FIG. 26 is an isometric view depicting a flag plate of the spring assembly of FIG. 15.

Still referring now to FIGS. 15-18, the spring assembly 102 can include a flag plate 138 that is coupled with each of the front and rear mount plates 104, 106 with fasteners (not shown). As illustrated in FIG. 26, the flag plate 138 can define a first slot 140, a pair of second slots 142, and a pair of third slots 144.

Figure 27:
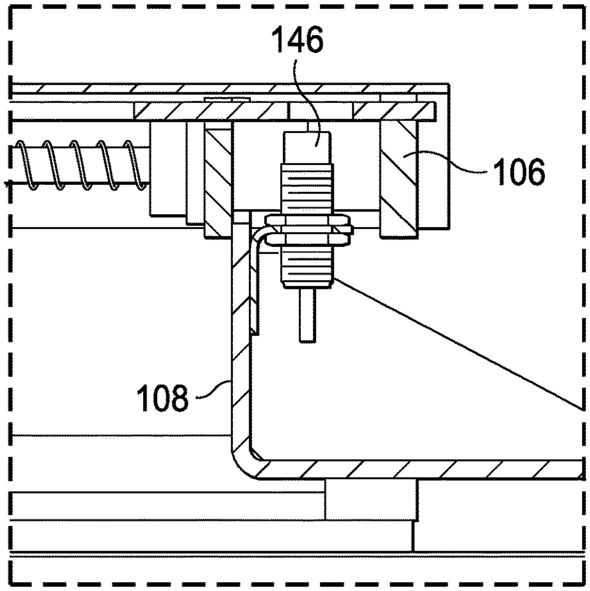
FIG. 27 is an enlarged view depicting the encircled portion of FIG. 8.

Referring now to FIGS. 7 and 27, three proximity sensors 146 can be mounted between the rear mount plate 106 and the spring stop plate 108 and can be spaced from the flag plate 138. The proximity sensors 146 can be in electrical communication with the electronic controller 51. One of the proximity sensors 146 can be aligned with the first slot 140, one of the proximity sensors 146 can be aligned with the second slots 142 and one of the proximity sensors 146 can be aligned with the third slots 144. When the spring stop plate 108 slides between the front and rear mount plates 104, 106 (as a result of the surface treatment device contacting a surface), the proximity sensors 146 can detect which of the first, second, and third slots 140, 142, 144 overlie the proximity sensors 146 and can provide feedback to the electronic controller 51. The electronic controller 51 can determine the travel distance of the spring stop plate 108 based upon the information from the proximity sensors 146 and can determine the amount of force being applied to the treated surface by the surface treatment device. The amount of force being applied can be controlled either automatically by the electronic controller 51 or manually by a user to apply the appropriate amount of force to enable the surface treatment device to operate effectively.

Figure 28:
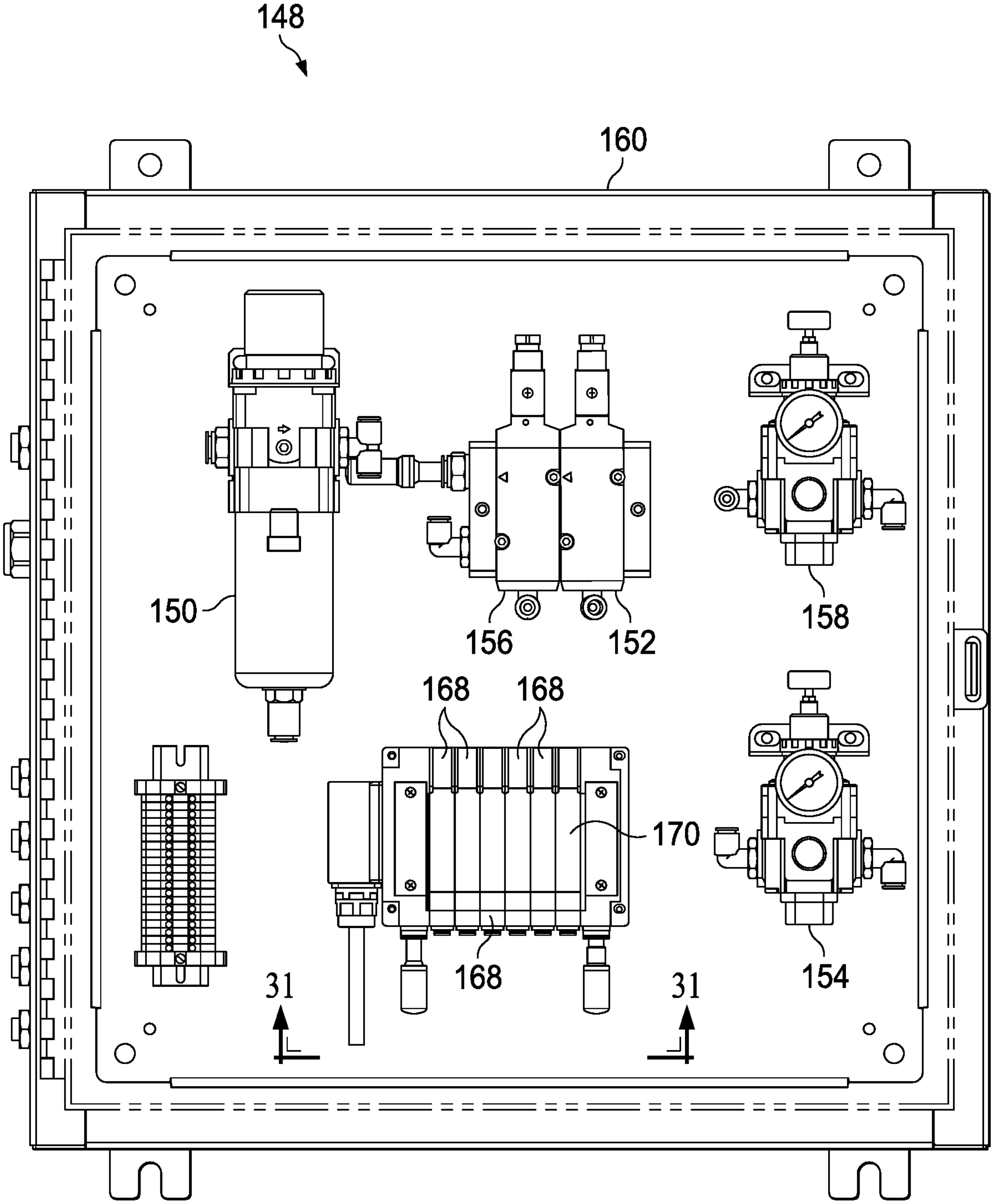
FIG. 28 is a front view depicting a pneumatic control system of the system of FIG. 1.

Referring now to FIGS. 28-31, the system 33 can include a pneumatic control system 148 that is configured to facilitate pneumatic operation of the tie rod 90 as well as the surface treatment device. In one embodiment, the pneumatic control system 148 can be coupled with the accessory carriage 54. As illustrated in FIG. 28, the pneumatic control system 148 can include a main regulator 150, a tie rod extend valve 152, a tie rod extend regulator 154, a tie rod retract valve 156, and a tie rod retract regulator 158, all mounted within a cabinet 160. A main regulator port 162 (FIG. 30) can be provided on an exterior of the cabinet 160 and can be in fluid communication with the main regulator 150. A retract port 164 and an extend port 166 can be provided on the exterior of the cabinet 160 and can be in fluid communication with the tie rod extend valve 152 and the tie rod retract valve 156, respectively. The main regulator 150 can be coupled with a fluid source (e.g., an air pump) via a pneumatic hose (not shown) that is coupled with the main regulator port 162.

Figure 29:
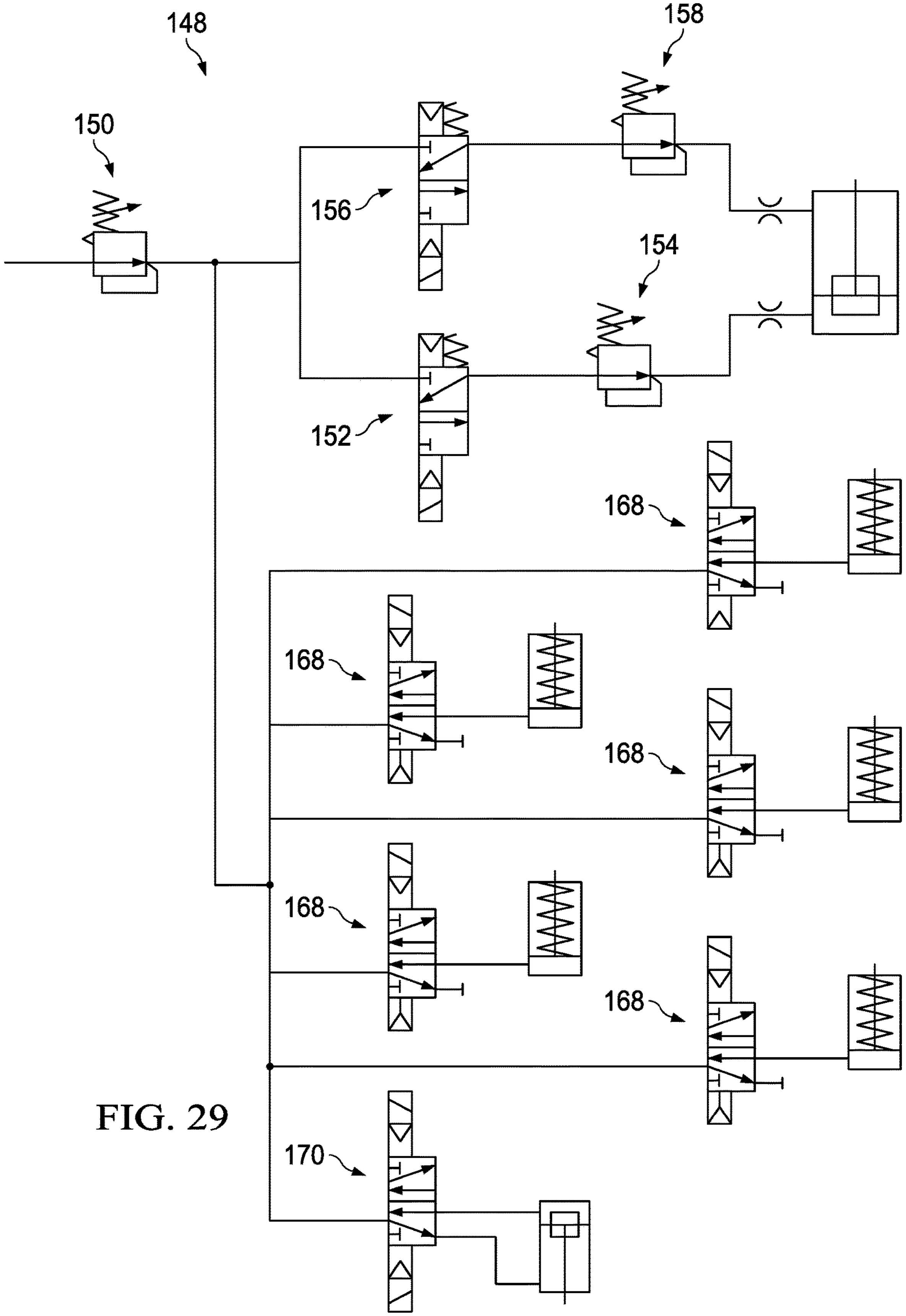
FIG. 29 is a schematic view depicting the pneumatic control system of FIG. 28.
Figure 30:
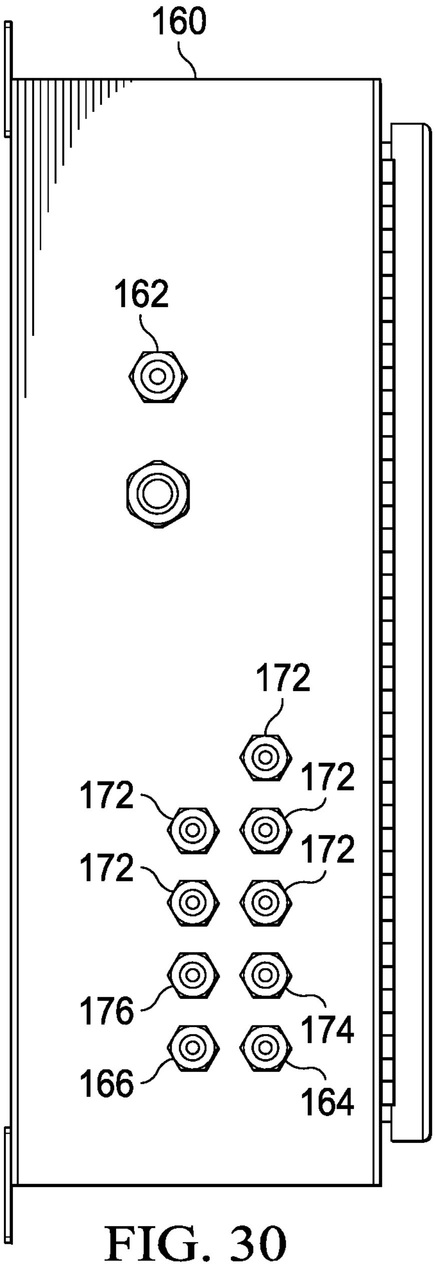
FIG. 30 is a side view depicting the a pneumatic control system of FIG. 30.
Figure 31:
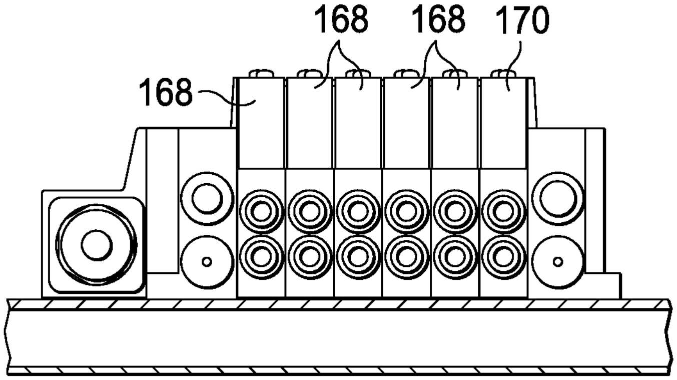
FIG. 31 is a sectional view taken along the line 31-31 in FIG. 28.

As illustrated in FIG. 29, the main regulator 150 can be in fluid communication with each of the tie rod extend valve 152 and the tie rod retract valve 156 which are arranged in parallel and are in fluid communication with the tie rod extend regulator 154 and the tie rod retract regulator 158, respectively. The tie rod extend regulator 154 and the tie rod retract regulator 158 can be in fluid communication with opposite sides of the tie rod 90 with a pair of pneumatic hoses coupled with the retract and extend ports 164, 166, respectively (FIG. 28).

Pneumatic fluid (e.g., air) can be provided to the main regulator 150 which provides the fluid to each of the tie rod extend valve 152 and the tie rod retract valve 156 at a desired pressure and/or flow rate (e.g., conditioned fluid). The tie rod extend valve 152 and the tie rod retract valve 156 can be individually actuated (e.g., by the controller and/or a user) to facilitate extension and retraction of the tie rod 90. When the tie rod extend valve 152 is actuated, fluid is permitted to flow through the tie rod extend regulator 154 (to further condition the fluid) and to one end of the tie rod 90 thus extending it. When the tie rod retract valve 156 is actuated, fluid is permitted to flow through the tie rod retract regulator 158 (to further condition the fluid) and to the other end of the tie rod 90 to retract it.

Referring again to FIG. 28, the pneumatic control system 148 can include a plurality of unidirectional valves 168 and a bidirectional valve 170 that are configured to facilitate powering of a surface treatment device attached thereto. A plurality of unidirectional valve ports 172 (FIG. 30) can be provided on an exterior of the cabinet 160 and can be in fluid communication with the unidirectional valves 168. Retract and extend valve ports 174, 176 (FIG. 30) can be provided on an exterior of the cabinet 160 and can be in fluid communication with opposite ends of the bidirectional valve 170, respectively. The surface treatment device housed in the accessory head 56 can be fluidly coupled with certain of the unidirectional valve ports 172 and/or the retract and extend valve ports 174, 176 to facilitate powering of the surface treatment device with the unidirectional valves 168 and the bidirectional valve 170.

As illustrated in FIG. 29, each of the unidirectional valves 168 and the bidirectional valve 170 can be in fluid communication with the main regulator 150 such that conditioned fluid is provided to each of unidirectional valves 168 and the bidirectional valve 170. The unidirectional valves 168 can provide fluid to the surface treatment device in one direction while the bidirectional valve 170 can oscillate the flow of the fluid provided to the surface treatment device (e.g., to enable an oscillating feature of the surface treatment device).

It is to be appreciated that the electronic controller 51 can be configured to implement different control schemes for the unidirectional valves 168 and the bidirectional valve 170 based upon the surface treatment device attached thereto. Each of these control schemes can be tailored to control various characteristics of the unidirectional valves 168 and/or the bidirectional valve 170 (e.g., the duration and frequency) in such a manner to enable proper operation of the connected surface treatment device. In one embodiment, the user can select (at the interface) the type of surface treatment device that is being employed, and the electronic controller 51 can automatically select the appropriate control scheme that facilitates appropriate operation of the surface treatment device. The electronic controller 51 can also provide instructions (e.g., a schematic) for properly connecting the surface treatment device to the unidirectional valve ports 172 and/or to the retract and extend valve ports 174, 176. For example, when the accessory head 56 is attached to the accessory carriage 54, each spray head 58 can be attached to one of the unidirectional valves 168 (but can remain disconnected from the bidirectional valve 170) to facilitate triggering of the spray heads 58. In another example, when scrub brushes are attached to the accessory carriage 54 (in place of the accessory head 56), the scrub brushes can be fluidly coupled with the bidirectional valve 170 (but can remain disconnected from the unidirectional valves 168) to facilitate oscillation of the scrub brushes.

The system 33 can be used to paint the surface of a variety of structures, such as an exterior surface of a building (not shown). To begin painting the structure, the user can identify the spray heads 58 at the user interface and can connect the spray heads 58 to the pneumatic control system 148, appropriately. The vehicle 34 can then be positioned alongside the surface with accessory head 56 positioned adjacent to the surface in the direction of travel parallel with the surface. The outriggers (e.g., 42) can be lowered to enhance the overall stability of the vehicle 34. The mast 44 can then be raised and telescoped to position the carriage assembly 50 at a desired elevated position (FIG. 3). The support table 74 can then be extended to provide the spray heads 58 at an appropriate position relative to the surface. Once the spray heads 58 are in place, they can be activated to dispense paint and the accessory carriage 54 can be lowered (e.g., to the lowered position illustrated in FIGS. 2 and 3) to apply a first coat of paint to the structure. Once the first vertical coat has been successfully applied (i.e., the entire height of the surface has been traversed), the carriage assembly 50 can be moved to an adjacent unpainted portion of the surface by moving the vehicle 34 and/or by adjusting the mast 44. The support table 74 can then be repositioned as necessary to set the spray heads 58 at an appropriate position relative to the surface. The spray heads 58 can then be activated to dispense paint and the accessory carriage 54 can be raised (e.g., to the raised position illustrated in FIG. 1) to apply a second horizontal coat of paint to the surface. Once the second horizontal coat has been successfully applied, the carriage assembly 50 can be moved to another adjacent unpainted portion of the surface and additional coats of paint can be applied to the unpainted surface in the manner described above until the entire surface has been painted. It is to be appreciated that, in some embodiments, the accessory carriage 54 can be returned to the raised position prior to moving the carriage assembly 50 to an adjacent vertical portion of the surface to prevent possible uncontrolled swinging of the accessory carriage 54 during movement. In these embodiments, each vertical coat of paint can be applied by dropping the accessory carriage 54 from the raised position to the lowered position.

The system 33 can be also be used to treat the surface of a variety of structures using contact type surface treatment devices, such as a paint roller or agitating scrubbers. The process for treating the surface with these surface treatment devices can be the same as described for the spray heads 58. However, once the mast 44 has positioned the carriage assembly 50 at a desired elevated position (FIG. 3), the support table 74 can be extended until the surface treatment device contacts the surface. The force of the contact can be detected by the proximity sensors 146 and the support table 74 can continue to be extended until the desired force has been reached.

In some embodiments, the electronic controller 51 can be configured to monitor the progress of the system 33 (e.g., with sensors) during operation and automatically adjust various parameters to enhance the application of the paint to the surface, such as, for example, the positioning of the spray heads 58 relative to the surface, the spray pattern/paint throughput of the spray heads 58, and/or the vertical speed/position of the accessory carriage 54.

Figure 32:
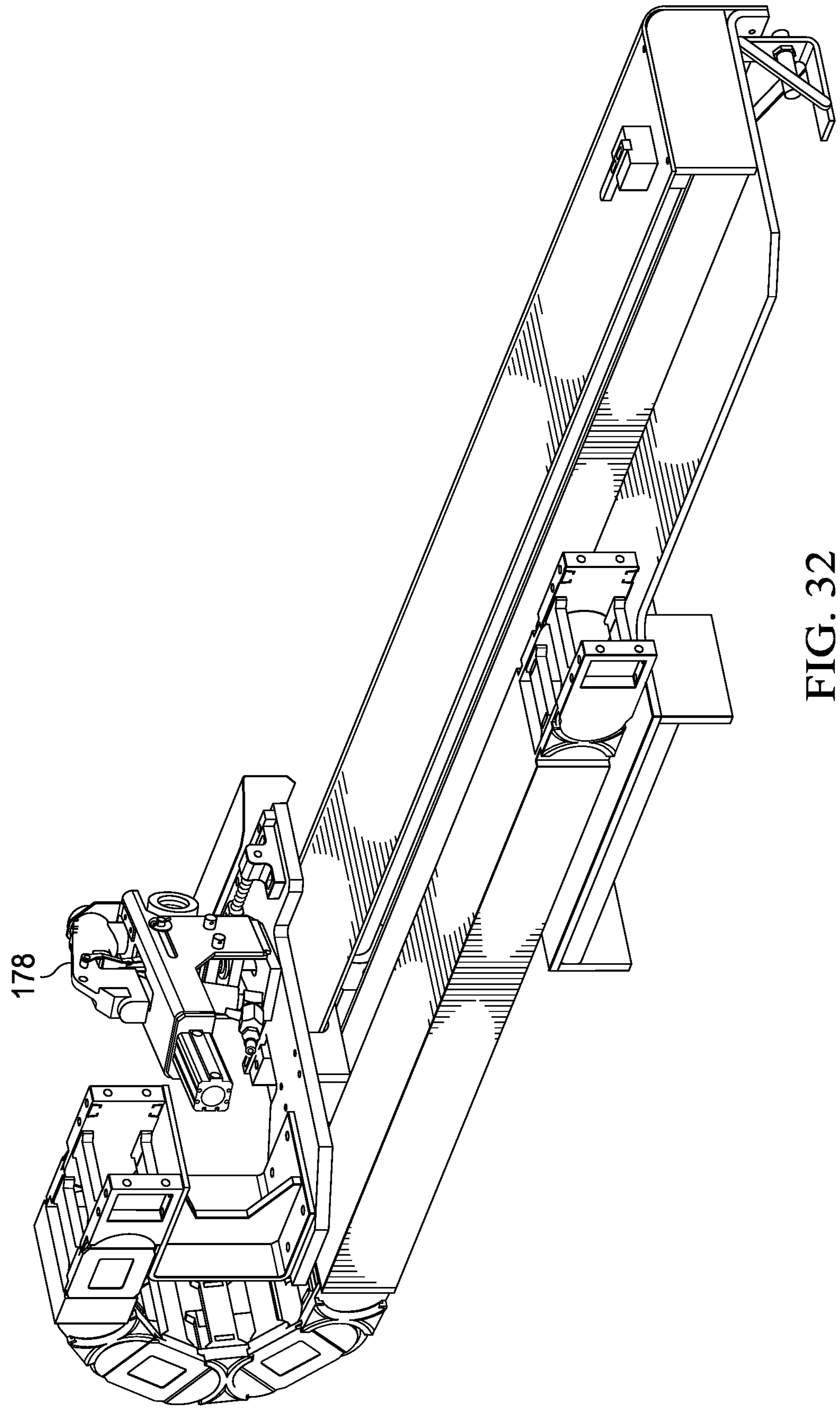
FIG. 32 is an isometric view depicting a spray head for textured material.

In one embodiment, the accessory head 56 can be interchangeable with different head units such that the system 33 is modular. Referring now to FIG. 32, a spray head 178 is provided that can be interchangeable with the accessory head 56. The spray head 178 can be configured to dispense textured material onto a surface.

Figure 33:
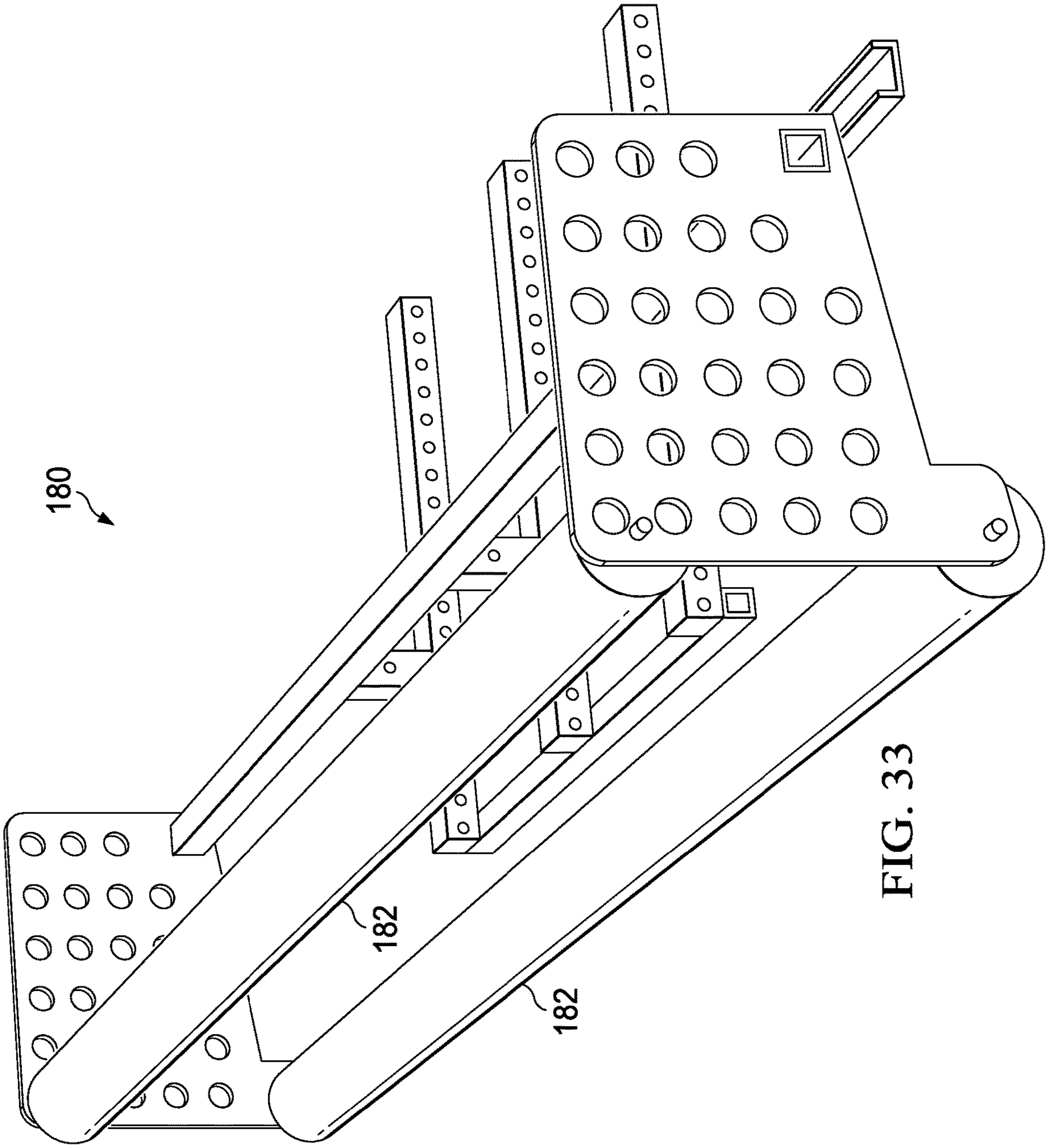
FIG. 33 is an isometric view depicting a roller assembly head.

Referring now to FIG. 33, a roller assembly head 180 is provided that can be interchangeable with the accessory head 56. The roller assembly head 180 can include a pair of rollers 182 that are configured to apply fluid (e.g., paint) to an adjacent surface. In one embodiment, an external source (not shown) can supply fluid to the rollers 182 that can be applied to the adjacent surface by the rollers 182.

Figure 34:
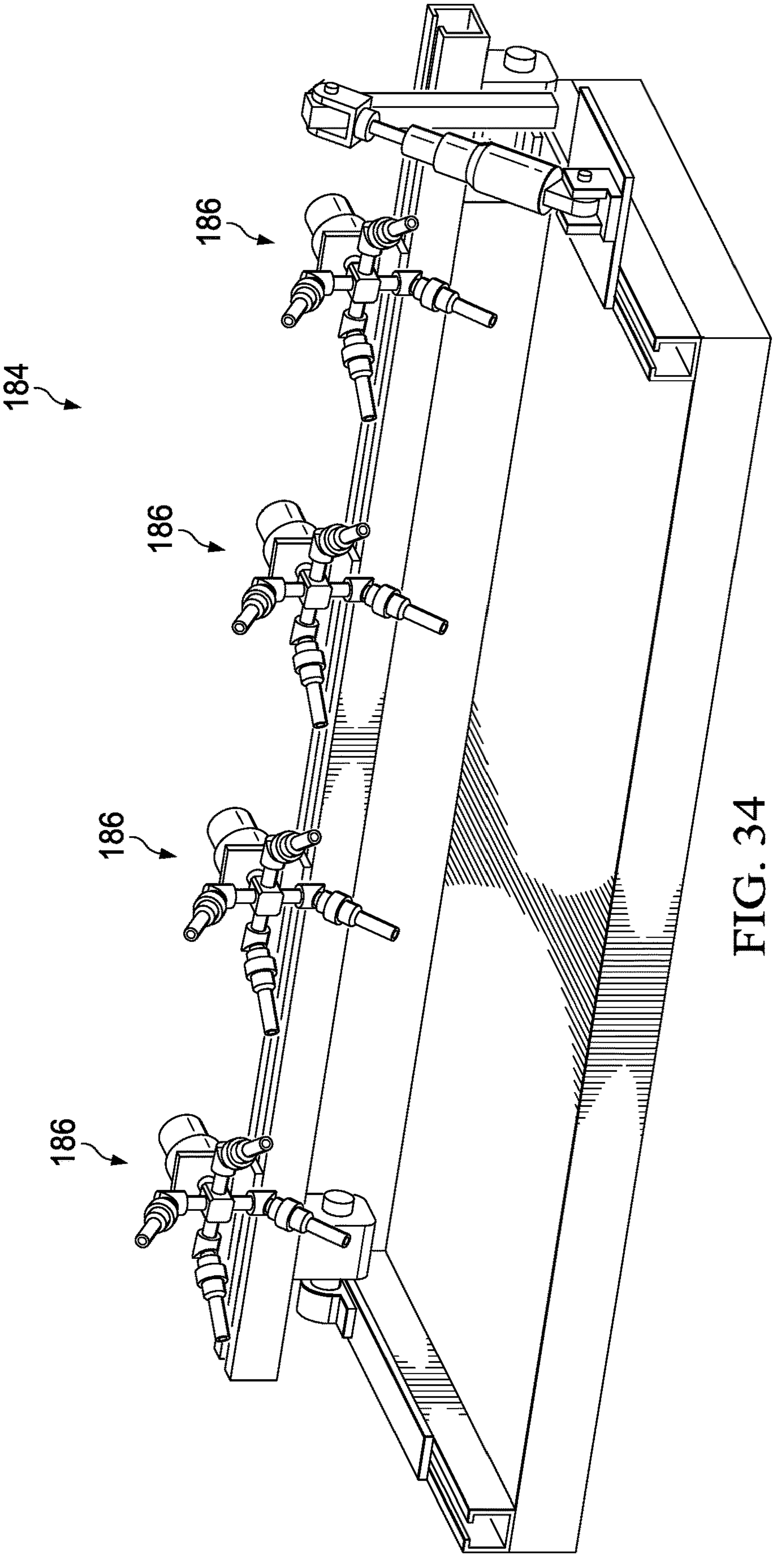
FIG. 34 is an isometric view depicting a pressure sprayer head.

Referring now to FIG. 34, a pressure spraying head 184 is provided that can be interchangeable with the accessory head 56. The pressure spraying head 184 can include a plurality of rotary spray heads 186 that are configured to dispense pressurized fluid (e.g., water) to an adjacent surface.

Figure 35:
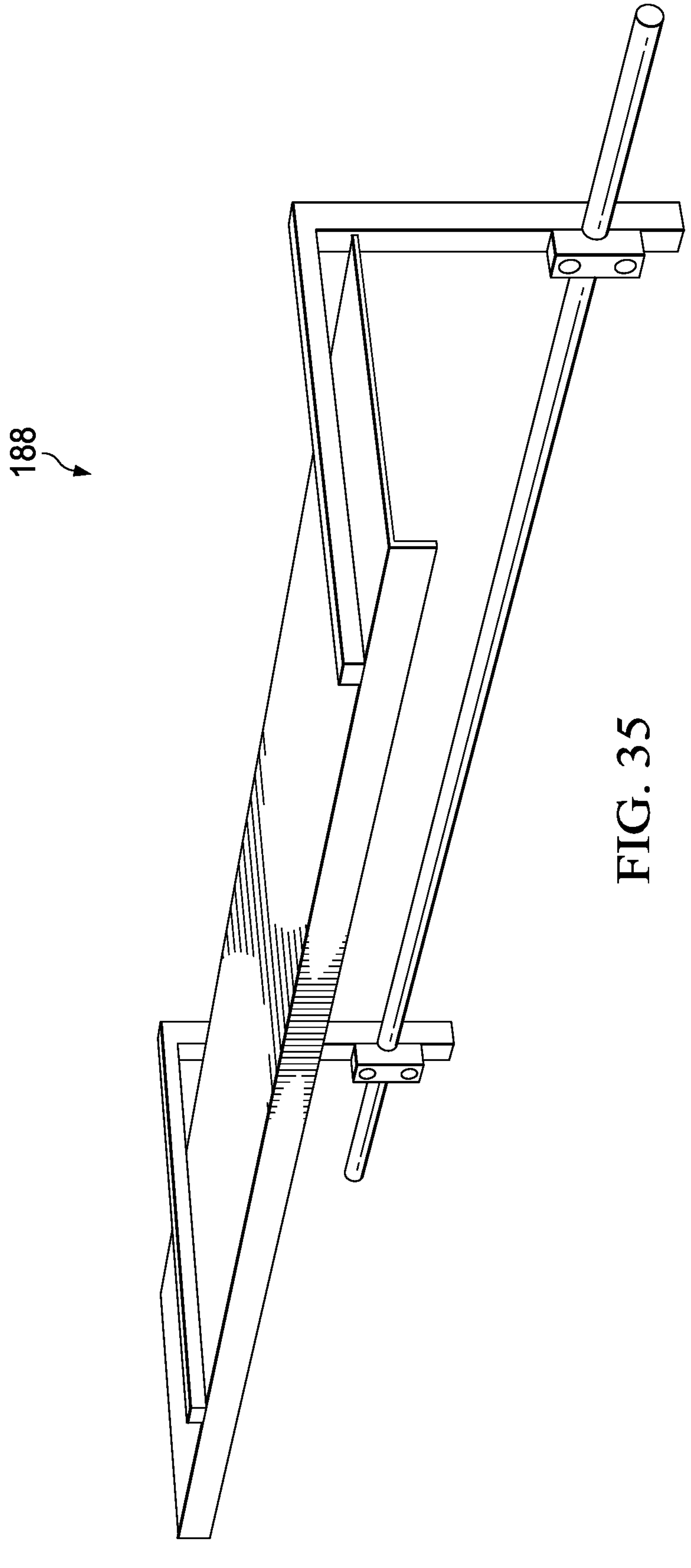
FIG. 35 is an isometric view depicting an overspray shroud.

Referring now to FIG. 35, an overspray shroud 188 is provided that can be installed on the accessory carriage 54 to facilitate deflection of overspray from the accessory head 56 or other head unit.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A system for treating a surface of a structure, the system comprising:

a vehicle being movable along a surface and comprising a frame and a mast movably coupled with the frame;

a carriage assembly supported by the mast, the carriage assembly comprising a main carriage and an accessory carriage that is movable with respect to the main carriage between a raised and retracted position and a lowered and extended position; and a surface treatment device coupled with the accessory carriage, wherein:

the mast is operable for raising and lowering the carriage assembly; and the accessory carriage is vertically spaced apart from the main carriage when in the lowered and extended position.

2. The system of claim 1 wherein the main carriage comprises a lowermost portion and when the accessory carriage is in the lowered and extended position, the accessory carriage is vertically spaced apart from the lowermost portion of the main carriage.

3. The system of claim 2 wherein the lowermost portion comprises at least one leg.

4. The system of claim 3 wherein, when the accessory carriage is in the lowered and extended position, the accessory carriage is disposed vertically beneath the at least one leg.

5. The system of claim 1 further comprising a winch mounted on the main carriage and comprising a cable that is coupled with the accessory carriage, wherein the winch facilitates raising and lowering of the accessory carriage between the raised and retracted position and the lowered and extended position.

6. The system of claim 1 further comprising a feed line that is in fluid communication with the surface treatment device via a reservoir.

7. The system of claim 6 further comprising a spool that is rotatable with respect to the accessory carriage and is configured to support the feed line.

8. The system of claim 1 further comprising a pneumatic control system that is configured to facilitate pneumatic operation of the surface treatment device.

9. The system of claim 8 wherein the pneumatic control system is coupled with the accessory carriage.

10. The system of claim 1 further comprising a shroud associated with the surface treatment device.

11. A system for treating a surface of a structure, the system comprising:

a vehicle being movable along a surface and comprising a frame and a mast movably coupled with the frame;

a carriage assembly supported by the mast, the carriage assembly comprising a main carriage and an accessory carriage that is movable with respect to the main carriage between a raised and retracted position and a lowered and extended position;

a surface treatment device coupled with the accessory carriage; and a winch mounted on the main carriage and comprising a cable that is coupled with the accessory carriage, wherein:

the mast is operable for raising and lowering the carriage assembly;

the accessory carriage is vertically spaced apart from the main carriage when in the lowered and extended position;

the main carriage comprises a lowermost portion and when the accessory carriage is in the lowered and extended position;

the accessory carriage is vertically spaced apart from the lowermost portion of the main carriage; and the winch facilitates raising and lowering of the accessory carriage between the raised and retracted position and the lowered and extended position.

12. A system for treating a surface of a structure, the system comprising:

a vehicle comprising a plurality of wheels that facilitates propulsion of the vehicle along a ground surface;

a carriage assembly coupled with the vehicle, the carriage assembly comprising a main carriage and an accessory carriage that is movable with respect to the main carriage between a raised and retracted position and a lowered and extended position; and a surface treatment device coupled with the accessory carriage, wherein the accessory carriage is vertically spaced apart from the main carriage when in the lowered and extended position.

13. The system of claim 12 wherein the main carriage comprises a lowermost portion and when the accessory carriage is in the lowered and extended position, the accessory carriage is vertically spaced apart from the lowermost portion of the main carriage.

14. The system of claim 13 wherein the lowermost portion comprises at least one leg.

15. The system of claim 14 wherein, when the accessory carriage is in the lowered and extended position, the accessory carriage is disposed vertically beneath the at least one leg.

16. The system of claim 12 further comprising a winch mounted on the main carriage and comprising a cable that is coupled with the accessory carriage, wherein the winch facilitates raising and lowering of the accessory carriage between the raised and retracted position and the lowered and extended position.

17. The system of claim 12 further comprising a feed line that is in fluid communication with the surface treatment device via a reservoir.

18. The system of claim 12 further comprising a pneumatic control system that is configured to facilitate pneumatic operation of the surface treatment device.

19. The system of claim 18 wherein the pneumatic control system is coupled with the accessory carriage.

20. The system of claim 12 further comprising a shroud associated with the surface treatment device.

* * * * *